(12) United States Patent
Das et al.

(10) Patent No.: US 11,855,998 B1
(45) Date of Patent: *Dec. 26, 2023

(54) ENABLING ROLE-BASED OPERATIONS TO BE PERFORMED ON MACHINE DATA IN A MACHINE ENVIRONMENT

(71) Applicant: SPLUNK INC., San Francisco, CA (US)

(72) Inventors: Robin Kumar Das, Healdsburg, CA (US); Ledio Ago, San Leandro, CA (US); Declan Gerald Shanaghy, Benica, CA (US); Gaurav Gupta, San Francisco, CA (US)

(73) Assignee: SPLUNK INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/677,760

(22) Filed: Feb. 22, 2022

Related U.S. Application Data

(63) Continuation of application No. 16/796,825, filed on Feb. 20, 2020, now Pat. No. 11,258,803, which is a
(Continued)

(51) Int. Cl.
*G06F 16/21* (2019.01)
*H04L 9/40* (2022.01)
(Continued)

(52) U.S. Cl.
CPC .......... *H04L 63/105* (2013.01); *G06F 9/4887* (2013.01); *G06F 9/5088* (2013.01);
(Continued)

(58) Field of Classification Search
CPC ...... G06F 16/21; G06F 16/162; G06F 16/955; G06F 16/2272; G06F 16/901;
(Continued)

(56) References Cited

U.S. PATENT DOCUMENTS

| | | | |
|---|---|---|---|
| 5,537,568 A * | 7/1996 | Yanai ..................... | G06F 12/123 |
| | | | 711/170 |
| 5,550,971 A * | 8/1996 | Brunner ............ | G06F 16/24552 |

(Continued)

FOREIGN PATENT DOCUMENTS

| | | |
|---|---|---|
| WO | 2013/025553 A2 | 2/2013 |
| WO | 2013/025556 A1 | 2/2013 |

OTHER PUBLICATIONS

Non Final Office Action received for U.S. Appl. No. 17/141,151 dated May 12, 2022, 32 pages.
(Continued)

*Primary Examiner* — Baoquoc N To
(74) *Attorney, Agent, or Firm* — Artegis Law Group, LLP

(57) ABSTRACT

Embodiments are directed towards a system and method for a cloud-based front end that may abstract and enable access to the underlying cloud-hosted elements and objects that may be part of a multi-tenant application, such as a search application. Search objects may be employed to access indexed objects. An amount of indexed data accessible to a user may be based on an index storage limit selected by the user, such that data that exceeds the index storage limit may continue to be indexed. Also, one or more projects can be elastically scaled for a user to provide resources that may meet the specific needs of each project.

20 Claims, 24 Drawing Sheets

Related U.S. Application Data continuation of application No. 15/967,398, filed on Apr. 30, 2018, now Pat. No. 10,616,236, which is a continuation of application No. 15/339,884, filed on Oct. 31, 2016, now Pat. No. 9,992,208, which is a continuation of application No. 14/735,120, filed on Jun. 9, 2015, now Pat. No. 9,516,029, which is a continuation of application No. 14/449,135, filed on Jul. 31, 2014, now Pat. No. 9,055,075, which is a continuation of application No. 14/068,445, filed on Oct. 31, 2013, now Pat. No. 8,849,779, which is a continuation of application No. 13/662,356, filed on Oct. 26, 2012, now Pat. No. 8,682,930, which is a continuation of application No. 13/572,434, filed on Aug. 10, 2012, now Pat. No. 8,682,860.

(60) Provisional application No. 61/523,063, filed on Aug. 12, 2011.

(51) Int. Cl.
| | | |
|---|---|---|
| *G06F 21/62* | (2013.01) | |
| *G06F 16/13* | (2019.01) | |
| *G06F 16/16* | (2019.01) | |
| *G06F 16/901* | (2019.01) | |
| *G06F 16/951* | (2019.01) | |
| *G06F 16/955* | (2019.01) | |
| *G06F 16/958* | (2019.01) | |
| *G06F 16/22* | (2019.01) | |
| *G06F 16/9537* | (2019.01) | |
| *G06Q 20/14* | (2012.01) | |
| *H04L 12/14* | (2006.01) | |
| *H04L 67/1097* | (2022.01) | |
| *G06F 9/48* | (2006.01) | |
| *G06F 9/50* | (2006.01) | |

(52) U.S. Cl.
CPC .......... *G06F 16/13* (2019.01); *G06F 16/134* (2019.01); *G06F 16/162* (2019.01); *G06F 16/21* (2019.01); *G06F 16/2228* (2019.01); *G06F 16/2272* (2019.01); *G06F 16/901* (2019.01); *G06F 16/951* (2019.01); *G06F 16/955* (2019.01); *G06F 16/9537* (2019.01); *G06F 16/986* (2019.01); *G06F 21/6218* (2013.01); *G06Q 20/145* (2013.01); *H04L 12/1435* (2013.01); *H04L 63/10* (2013.01); *H04L 67/1097* (2013.01)

(58) Field of Classification Search
CPC .............. G06F 16/986; G06F 16/2228; G06F 16/9537; G06F 16/951; G06F 16/13; G06F 16/134
See application file for complete search history.

(56) References Cited

U.S. PATENT DOCUMENTS

| | | |
|---|---|---|
| 5,950,465 A | 9/1999 | Schultz et al. |
| 5,974,409 A | 10/1999 | Sanu et al. |
| 6,292,795 B1 | 9/2001 | Peters et al. |
| 6,415,319 B1 | 7/2002 | Ambroziak |
| 6,449,714 B1 | 9/2002 | Sinharoy |
| 6,772,348 B1 | 8/2004 | Ye |
| 7,284,244 B1 | 10/2007 | Sankaranarayan et al. |
| 7,299,171 B2 | 11/2007 | Ta et al. |
| 7,496,919 B1 | 2/2009 | Mishra et al. |
| 7,562,069 B1 | 7/2009 | Chowdhury et al. |
| 7,653,688 B2 | 1/2010 | Bittner |
| 7,657,512 B2 | 2/2010 | Fischer |
| 7,676,510 B1 | 3/2010 | Karinta |
| 7,730,523 B1 | 6/2010 | Masurkar |
| 7,924,675 B2 | 4/2011 | Maeda |
| 7,937,344 B2 | 5/2011 | Baum et al. |
| 7,958,509 B2 | 6/2011 | Aridor et al. |
| 8,010,991 B2 | 8/2011 | Sarukkai et al. |
| 8,112,425 B2 | 2/2012 | Baum et al. |
| 8,117,464 B1 | 2/2012 | Kogelnik |
| 8,230,510 B1 | 7/2012 | Yang et al. |
| 8,311,964 B1 | 11/2012 | Efstathopoulos et al. |
| 8,396,838 B2 | 3/2013 | Brockway et al. |
| 8,495,625 B1 | 7/2013 | Sanders |
| 3,548,997 A1 | 10/2013 | Wu |
| 8,660,649 B2 | 2/2014 | Ruffini et al. |
| 8,713,000 B1 | 4/2014 | Elman et al. |
| 8,751,529 B2 | 6/2014 | Zhang et al. |
| 8,788,525 B2 | 7/2014 | Neels et al. |
| 8,788,590 B2 | 7/2014 | Culver et al. |
| 8,849,779 B2 | 9/2014 | Das et al. |
| 8,868,560 B2 | 10/2014 | Spivack et al. |
| 9,037,562 B2 | 5/2015 | Das et al. |
| 9,055,075 B2 | 6/2015 | Das et al. |
| 9,215,240 B2 | 12/2015 | Merza et al. |
| 9,225,724 B2 | 12/2015 | Das et al. |
| 9,286,413 B1 | 3/2016 | Coates et al. |
| 9,413,677 B1 | 8/2016 | Vargantwar |
| 9,497,199 B2 | 11/2016 | Das et al. |
| 9,516,029 B2 | 12/2016 | Das et al. |
| 10,127,258 B2 | 11/2018 | Lamas et al. |
| 2002/0054101 A1 | 5/2002 | Beatty |
| 2002/0083053 A1 | 6/2002 | Richard et al. |
| 2002/0107842 A1 | 8/2002 | Biebesheimer et al. |
| 2002/0112240 A1 | 8/2002 | Bacso et al. |
| 2002/0194167 A1 | 12/2002 | Bakalash et al. |
| 2003/0046345 A1 | 3/2003 | Wada et al. |
| 2003/0086557 A1 | 5/2003 | Shambaugh et al. |
| 2003/0179114 A1 | 9/2003 | Kampf |
| 2003/0187821 A1 | 10/2003 | Cotton et al. |
| 2003/0191770 A1 | 10/2003 | Nudi et al. |
| 2004/0078359 A1 | 4/2004 | Bolognese et al. |
| 2004/0107131 A1 | 6/2004 | Wilkerson et al. |
| 2004/0117358 A1 | 6/2004 | Von Kaenel et al. |
| 2004/0220965 A1 | 11/2004 | Harville et al. |
| 2004/0225641 A1 | 11/2004 | Dettinger et al. |
| 2005/0044198 A1 | 2/2005 | Okitsu et al. |
| 2006/0004691 A1 | 1/2006 | Sifry |
| 2006/0041421 A1 | 2/2006 | Ta et al. |
| 2006/0047576 A1 | 3/2006 | Aaltonen et al. |
| 2006/0095690 A1 | 5/2006 | Craddock et al. |
| 2006/0143159 A1 | 6/2006 | Chowdhury et al. |
| 2006/0143617 A1 | 6/2006 | Knauerhase et al. |
| 2006/0253423 A1 | 11/2006 | Mclane et al. |
| 2006/0293979 A1 | 12/2006 | Cash et al. |
| 2007/0043639 A1 | 2/2007 | Tabs et al. |
| 2007/0074057 A1 | 3/2007 | Hellerstein et al. |
| 2007/0214163 A1 | 9/2007 | Luo et al. |
| 2007/0214164 A1 | 9/2007 | Maclennan et al. |
| 2007/0226174 A1 | 9/2007 | Saito |
| 2007/0266218 A1 | 11/2007 | Achiwa |
| 2007/0300220 A1 | 12/2007 | Seliger et al. |
| 2007/0300221 A1 | 12/2007 | Hartz et al. |
| 2008/0021865 A1 | 1/2008 | Corkill et al. |
| 2008/0022016 A1 | 1/2008 | Tripathi et al. |
| 2008/0059177 A1 | 3/2008 | Poirier et al. |
| 2008/0077538 A1 | 3/2008 | Schebece |
| 2008/0082769 A1 | 4/2008 | Bouchou et al. |
| 2008/0104542 A1 | 5/2008 | Cohen et al. |
| 2008/0147487 A1 | 6/2008 | Hirshberg |
| 2008/0201118 A1 | 8/2008 | Luo |
| 2008/0215663 A1 | 9/2008 | Ushiyama |
| 2008/0222125 A1 | 9/2008 | Chowdhury |
| 2008/0270366 A1 | 10/2008 | Frank |
| 2009/0077317 A1 | 3/2009 | Kavuri et al. |
| 2009/0083285 A1 | 3/2009 | Krause |
| 2009/0089334 A1 | 4/2009 | Mohamed et al. |
| 2009/0254572 A1 | 10/2009 | Redlich et al. |
| 2009/0265747 A1 | 10/2009 | Li |
| 2009/0300065 A1 | 12/2009 | Birchall |
| 2009/0327319 A1 | 12/2009 | Bertram et al. |
| 2010/0030355 A1 | 2/2010 | Insolia et al. |

(56) References Cited

U.S. PATENT DOCUMENTS

| | | |
|---|---|---|
| 2010/0095018 A1 | 4/2010 | Khemani et al. |
| 2010/0131957 A1 | 5/2010 | Kami |
| 2010/0250497 A1 | 9/2010 | Redlich et al. |
| 2010/0251100 A1 | 9/2010 | Delacourt |
| 2010/0281028 A1 | 11/2010 | Luo et al. |
| 2010/0306281 A1 | 12/2010 | Williamson |
| 2010/0306775 A1 | 12/2010 | Appiah et al. |
| 2011/0004566 A1 | 1/2011 | Berkowitz et al. |
| 2011/0061057 A1 | 3/2011 | Harris et al. |
| 2011/0137884 A1 | 6/2011 | Anantharajan |
| 2011/0138144 A1 | 6/2011 | Tamura et al. |
| 2011/0213686 A1 | 9/2011 | Ferris et al. |
| 2011/0270886 A1 | 11/2011 | An et al. |
| 2011/0289027 A1 | 11/2011 | Moore |
| 2011/0307263 A1 | 12/2011 | Bader et al. |
| 2012/0005312 A1 | 1/2012 | Mcgowan et al. |
| 2012/0005313 A1 | 1/2012 | Mcgowan et al. |
| 2012/0030355 A1 | 2/2012 | Iyer et al. |
| 2012/0096497 A1 | 4/2012 | Xiong et al. |
| 2012/0117116 A1 | 5/2012 | Jacobson et al. |
| 2012/0143928 A1 | 6/2012 | Yankov et al. |
| 2012/0147192 A1 | 6/2012 | Wright et al. |
| 2012/0233147 A1 | 9/2012 | Solheim et al. |
| 2012/0244510 A1 | 9/2012 | Watkins, Jr. |
| 2012/0283948 A1 | 11/2012 | Demiryurek et al. |
| 2012/0284776 A1 | 11/2012 | Sundaram et al. |
| 2013/0041824 A1 | 2/2013 | Gupta |
| 2013/0041871 A1 | 2/2013 | Das et al. |
| 2013/0041874 A1 | 2/2013 | Dohm et al. |
| 2013/0042008 A1 | 2/2013 | Das et al. |
| 2013/0054537 A1 | 2/2013 | Das et al. |
| 2013/0054642 A1 | 2/2013 | Morin |
| 2013/0054814 A1 | 2/2013 | Das et al. |
| 2013/0060912 A1 | 3/2013 | Rensin et al. |
| 2013/0073957 A1 | 3/2013 | Digiantomasso et al. |
| 2013/0111035 A1 | 5/2013 | Alapati et al. |
| 2013/0262371 A1 | 10/2013 | Nolan |
| 2013/0290494 A1 | 10/2013 | Goudarzi et al. |
| 2014/0019909 A1 | 1/2014 | Leonard et al. |
| 2014/0046976 A1 | 2/2014 | Zhang et al. |
| 2014/0059036 A1 | 2/2014 | Das et al. |
| 2014/0297521 A1 | 10/2014 | Das et al. |
| 2014/0344900 A1 | 11/2014 | Das et al. |
| 2015/0220585 A1 | 8/2015 | Das et al. |
| 2015/0269005 A1 | 9/2015 | Das et al. |
| 2015/0281243 A1 | 10/2015 | Das et al. |
| 2016/0164873 A1 | 6/2016 | Das et al. |
| 2019/0098106 A1 | 3/2019 | Mungel et al. |

OTHER PUBLICATIONS

International Search Report in application No. PCT/US2012/050456 dated Nov. 28, 2012.
Non Final Office Action received for U.S. Appl. No. 13/572,464, dated Mar. 5, 2013, 19 pages.
International Search Report in application No. PCT/US2012/050452 dated Feb. 21, 2013.
Final Office Action received for U.S. Appl. No. 13/572,464, dated Jul. 16, 2013, 18 pages.
Final Office Action received for U.S. Appl. No. 13/662,362 dated Aug. 8, 2013, 10 pages.
Non Final Office Action received for U.S. Appl. No. 13/662,362 dated Mar. 27, 2013, 16 pages.
Splunk Enterprise 8.0.0 Overview, available online, retrieved on May 20, 2020 from docs.splunk.com, 17 pages.
Splunk Cloud 8.0.2004 User Manual, available online, retrieved on May 20, 2020 from docs.splunk.com, 66 pages.
Splunk Quick Reference Guide, updated 2019, available online at https://www.splunk.com/pdfs/solution-guides/splunk-quick-reference-guide.pdf, retrieved on May 20, 2020, 6 pages.
Carraso, David, "Exploring Splunk," published by CITO Research, New York, NY, Apr. 2012, 156 pages.
Bitincka et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, 9 pages.
Notice of Allowance received for U.S. Appl. No. 17/141,151 dated Sep. 1, 2022, 14 pages.
Ganesan, H. et al., "Auto Scaling Solution in AWS Cloud," www.Bkmiles.com, Jul. 2010.
Non Final Office Action received for U.S. Appl. No. 16/439,598 dated May 1, 2020, 24 pages.
Notice of Allowance received for U.S. Appl. No. 16/439,598 dated Aug. 28, 2020, 8 pages.
Non Final Office Action received for U.S. Appl. No. 16/796,825, dated Jun. 14, 2021, 25 pages.
Notice of Allowance received for U.S. Appl. No. 16/796,825, dated Oct. 15, 2021, 39 pages.
International Search Report in International Patent Application No. PCT/US2012/050456 dated Nov. 28, 2012.
International Search Report and Written Opinion for International Patent Application No. PCT/US2012/050452 dated Feb. 21, 2013.
Non Final Office Action received for U.S. Appl. No. 13/572,434 dated Jan. 17, 2013, 7 pages.
Notice of Allowance received for U.S. Appl. No. 13/572,434 dated Dec. 6, 2013, 22 pages.
Non Final Office Action received for U.S. Appl. No. 13/662,356 dated Jan. 11, 2013, 10 pages.
Notice of Allowance received for U.S. Appl. No. 13/662,356 dated Dec. 18, 2013, 27 pages.
Non Final Office Action received for U.S. Appl. No. 14/068,445 dated Jan. 13, 2014, 15 pages.
Notice of Allowance received for U.S. Appl. No. 14/068,445 dated Jul. 8, 2014, 19 pages.
Non Final Office Action received for U.S. Appl. No. 14/303,596 dated Jul. 28, 2014, 26 pages.
Notice of Allowance received for U.S. Appl. No. 14/303,596 dated Jan. 30, 2015, 9 pages.
Non Final Office Action received for U.S. Appl. No. 14/449,135 dated Sep. 9, 2014, 12 pages.
Final Office Action received for U.S. Appl. No. 14/449,135 dated Mar. 11, 2015, 10 pages.
Notice of Allowance received for U.S. Appl. No. 14/449,135 dated Apr. 21, 2015, 12 pages.
Non Final Office Action received for U.S. Appl. No. 14/690,249 dated Jul. 31, 2015, 17 pages.
Final Office Action received for U.S. Appl. No. 14/690,249 dated Jan. 6, 2016, 19 pages.
Notice of Allowance received for U.S. Appl. No. 14/690,249 dated Mar. 9, 2016, 7 pages.
Notice of Allowance received for U.S. Appl. No. 14/733,870 dated Oct. 23, 2015, 17 pages.
Non Final Office Action received for U.S. Appl. No. 14/735,120 dated Aug. 31, 2015, 15 pages.
Ex Parte Quayle Action received for U.S. Appl. No. 14/735,120 dated Mar. 11, 2016, 13 pages.
Notice of Allowance received for U.S. Appl. No. 14/735,120 dated Aug. 3, 2016, 10 pages.
Non Final Office Action received for U.S. Appl. No. 15/007,184 dated Mar. 24, 2016, 21 pages.
Notice of Allowance received for U.S. Appl. No. 15/007,184 dated Jul. 14, 2016, 9 pages.
Non Final Office Action received for U.S. Appl. No. 15/336,834 dated Mar. 24, 2017, 14 pages.
Notice of Allowance received for U.S. Appl. No. 15/336,834 dated Sep. 8, 2017, 7 pages.
Non Final Office Action received for U.S. Appl. No. 15/339,884 dated Apr. 21, 2017, 20 pages.
Final Office Action received for U.S. Appl. No. 15/339,884 dated Sep. 27, 2017, 16 pages.
Advisory Action received for U.S. Appl. No. 15/339,884 dated Dec. 29, 2017, 2 pages.
Notice of Allowance received for U.S. Appl. No. 15/339,884 dated Mar. 5, 2018, 7 pages.

(56) References Cited

OTHER PUBLICATIONS

Non Final Office Action received for U.S. Appl. No. 15/872,837 dated Apr. 19, 2018, 11 pages.
Final Office Action received for U.S. Appl. No. 15/872,837 dated Dec. 5, 2018, 21 pages.
Notice of Allowance received for U.S. Appl. No. 15/872,837 dated Mar. 11, 2019, 7 pages.
Non Final Office Action received for U.S. Appl. No. 15/967,398 dated Apr. 18, 2019, 27 pages.
Final Office Action received for U.S. Appl. No. 15/967,398 dated Aug. 22, 2019, 6 pages.
Notice of Allowance received for U.S. Appl. No. 15/967,398 dated Nov. 20, 2019, 7 pages.
Non Final Office Action received for U.S. Appl. No. 18/075,337 dated May 10, 2023, 33 pages.
Notice of Allowance received for U.S. Appl. No. 18/075,337 dated Jul. 11, 2023, 11 pages.

* cited by examiner

ENABLING ROLE-BASED OPERATIONS TO BE PERFORMED ON MACHINE DATA IN A MACHINE ENVIRONMENT

CROSS REFERENCE TO RELATED APPLICATIONS

This application is a continuation of U.S. patent application titled, "ENABLING ROLE-BASED OPERATIONS TO BE PERFORMED ON MACHINE DATA IN A MACHINE ENVIRONMENT," filed Feb. 20, 2020 and having Ser. No. 16/796,825, which is a continuation of U.S. patent application titled, "ENABLING ROLE-BASED OPERATIONS TO BE PERFORMED ON MACHINE DATA IN A MACHINE ENVIRONMENT," filed Apr. 30, 2018 and having Ser. No. 15/967,398, now U.S. Pat. No. 10,616,236, which is a continuation of U.S. patent application titled "ROLE-BASED APPLICATION PROGRAM OPERATIONS ON MACHINE DATA IN A MULTI-TENANT ENVIRONMENT", filed Oct. 31, 2016 and having Ser. No. 15/339,884, now U.S. Pat. No. 9,992,208, which is a continuation of U.S. patent application titled, "SEARCHING INDEXED DATA BASED ON USER ROLES", filed Jun. 9, 2015 and having Ser. No. 14/735,120, now U.S. Pat. No. 9,516,029, which is a continuation of U.S. patent application titled, "PROJECT RESOURCE ACCESS CONTROL", filed Jul. 31, 2014 and having Ser. No. 14/449,135, now U.S. Pat. No. 9,055,075, which is a continuation of U.S. patent application titled, "ELASTIC SCALING OF DATA VOLUME", filed Oct. 31, 2013 and having Ser. No. 14/068,445, now U.S. Pat. No. 8,849,779, which is a continuation of U.S. patent application titled, "DATA VOLUME MANAGEMENT," filed Oct. 26, 2012 and having Ser. No. 13/662,356, now U.S. Pat. No. 8,682,930, which is a continuation of U.S. patent application titled, "DATA VOLUME MANAGEMENT," filed Aug. 10, 2012 and having Ser. No. 13/572,434, now U.S. Pat. No. 8,682,860, which claims the priority benefit of the U.S. Provisional Patent Application titled, "DATA VOLUME MANAGEMENT," filed on Aug. 12, 2011 and having Ser. No. 61/523,063. The subject matter of these related applications is hereby incorporated herein by reference.

TECHNICAL FIELD

The invention is directed to providing services for use by a customer, and more particularly, to enabling role-based operations to be performed on machine data in a machine environment.

BACKGROUND

Many companies install and maintain software for use on a variety of distributed systems that can range from a single computer for a small business to a collection of servers and a plurality of user computer nodes for a large corporation. Also, the volume of data processed by a node in a small business can be a magnitude less than the volume of data processed by a node in a large corporation. Further, at different times the amount of data to be indexed for searching and the need for speed to search the indexed data can vary.

Additionally, the type of data processed by large and small business can vary widely, such as sending and receiving messages, creating and storing documents, hosting web sites, database searches, facilitating online transactions, and the like. Furthermore, the expense of developing and maintaining software that can handle the type and volume of data processed by a large corporation can be substantially greater than the effort expended to do somewhat the same for a small business. Consequently, cloud-based systems that provide software as a service are increasingly popular with different sizes of businesses having different volumes of data and types of data.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DESCRIPTION OF VARIOUS EMBODIMENTS

Figure 1:
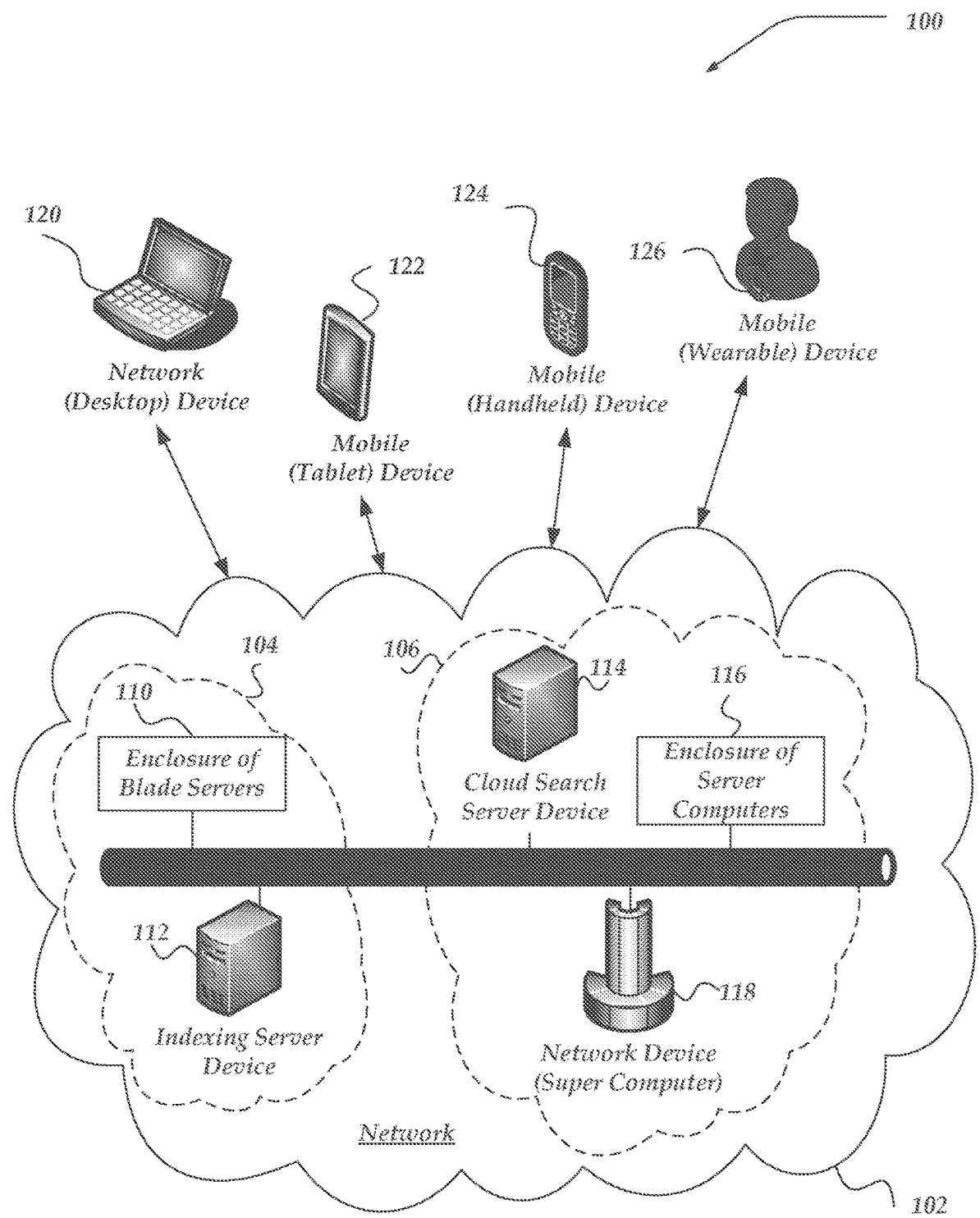
FIG. 1 illustrates a system environment in which various embodiments may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

For example embodiments, the following terms are also used herein according to the corresponding meaning, unless the context clearly dictates otherwise.

"Frontend User" as used herein may represent users at the outer cloud-based edge of some of the described embodiments. This outer edge may often be described herein as the Web Application Layer, or Cloud layer.

"Core User" as used herein may represent abstract users that are within the middle of the layers of described embodiments. These middle layers may often be described herein as Search Head layers, or Core layers.

"Apps" as used herein may collectively represent software programs and processes that may implement various features and processing for the various embodiments, some of which are described herein. Apps may give users insights into their projects with dashboards, reports, data inputs, and saved searches that may work in the project environment from the moment they are installed. Apps may include new views and dashboards that may completely reconfigure the way a project looks. Or, they may be as complex as an entirely new program. In some embodiments, Apps may also represent index resources.

"Index", "Indexer", "Indexing", and "Index Storage" as used herein may represent elements of described embodiments that may index and store data and events. Indexers may collect, parse, and store data to facilitate fast and accurate information retrieval. Index design may incorporate interdisciplinary concepts from linguistics, cognitive psychology, mathematics, informatics, physics, and computer science. Also, Indexes may reside in flat files in a data store on a file system. Index files may be managed to facilitate flexible searching and fast data retrieval, eventually archiving them according to a configurable schedule. During indexing, incoming raw data may be processed to enable fast search and analysis, the results of which may be stored in an index. As part of the indexing process, the indexer may add knowledge to the data in various ways, including by: separating a data stream into individual, searchable events; creating or identifying timestamps; extracting fields such as host, source, and source type; performing user-defined actions on the incoming data, such as identifying custom fields, masking sensitive data, writing new or modified keys, applying breaking rules for multi-line events, filtering unwanted events, and routing events to specified indexes or servers, and the like. In some embodiments, index store may store data indexed by one or more indexers. In at least one embodiment, indexer may include indexer severs.

"Roles" as used herein may represent definitions of the access permissions and authorizations that enable a Core User to execute various features, Apps, or access data, in the various embodiments. Roles may define how a Core User may interact with Apps, Indexes, Indexers, and the like.

"Dimension" as used herein when describing elastic scaling, may refer to the particular kind of project resources that may be scaled, e.g., index storage, processing performance, time-window, price, network bandwidth, and the like. Embodiments may be arranged and configured to define dimensions differently, e.g., one embodiment may be arranged to define an elastic scaling dimension that represents network latency, where another embodiment may be arranged and configured to combine CPU quota, network latency, network bandwidth into a single dimension representing processing performance. One of ordinary skill in the art will appreciate that there may be many combinations of resources that may arranged into elastic scaling dimensions.

Multi-tenant cloud-based data storage volumes may be built to support manual and rule-based elastic scaling. Elastic scaling may occur in one or more dimensions, such as scaling of storage, scaling of processing performance, or time windows of received data, and the like. Elastic scaling may occur in one or more dimensions singly or in combination. If elastic scaling occurs, the appropriate objects, processes, memory, and storage may be scaled to meet the request resource increase or decrease. There may be numerous dependent or supporting systems that may need to scale in response to an elastic scaling request. For example, a request to elastically scale processing performance may require one or more elements of the system to be scaled in addition to the CPU quota, such as, disk quota, high local cache quota, and the like.

The following briefly describes embodiments in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards a system and method for a cloud-based front end that may abstract and enable access to the underlying cloud-hosted elements and objects that may be part of a multi-tenant application, such as a search application. Search objects may be employed to access indexed objects. Also, one or more projects can be elastically scaled for a user to provide resources that may meet the specific needs of each project.

In some embodiments, at least one project for at least one frontend user may be initialized. In at least one embodiment, the frontend user may be enabled to interact with the project through at least one application. Each project may have a corresponding index store, which may include one or more indexer servers. In at least one embodiment, a data volume limit may be established for the index store. The data volume limit may be based on a selection by the frontend user.

Data provided for the project may be indexed. In some embodiments, if an amount of indexed data in the index store is less than the data volume limit, then the indexed data may be stored in the index store. In other embodiments, if the amount of indexed data in the index store at least equals the data volume limit, then the indexed data may be stored in an overflow index store. In at least one embodiment, the indexed data in the index store may be accessible to the frontend user and the indexed data in the overflow index store may be inaccessible to the frontend user (e.g., the frontend user may be prevented from accessing the data unless the user increases the data volume limit, such as by purchasing additional data storage).

If the data volume limit is increased, then at least a portion of indexed data in the overflow index store may be provided to the index store, such that the provided indexed data is accessible in the index store to the frontend user. In at least one embodiment, the data volume limit may be increased based on another selection by the frontend user.

In other embodiments, the user may be enabled to elastically scale one or more computing resources associated with a project. A resource allocation may be determined for indexing data provided for a project for each of a plurality of resources. In at least one embodiment, the resources may include at least one indexer server instance that indexes the provided data, a data store (i.e., storage capacity) that stores the indexed data, an event time window, or the like.

In at least one embodiment, a request may be provided from a user to scale at least one of the plurality of resources. In some embodiments, the user may be enabled to utilize a slider control (or other user interface) to manually adjust one or more computing resources. In response to the request, the resource allocation for at least one of the plurality of resources may be adjusted based on the request. At least one of the plurality of resources may be changed based on the adjusted resource allocation, which may be employed to subsequently index data provided for the project. In some embodiments, at least one type of additional resource may be allocated if the request indicates an increase in the plurality of resources. In other embodiments, less of at least one type of resource may be allocated if the change indicates a decrease in the plurality of resources.

In some embodiments, an increase or decrease in one resource may correspond to an increase or decrease in another resource. In at least one embodiment, if a resource is elastically scaled, then a number of indexers may be increased or decreased to accommodate the change in resources. In some embodiments, decreasing a number of indexers may include marking an indexer as read-only and increasing a number of indexers may include marking a read-only indexer as read/write and/or adding a new indexer.

In some embodiments, changing resources may include changing a number of indexer servers employed to index data for the project, changing an amount of storage for the data store to store data for the project, changing an amount of memory employed to process the indexing of data for the project, changing an amount of processors employed to process the indexing of data for the project, or the like.

Additionally, it should be appreciated that though many embodiments described herein may be cloud-based, embodiments should not be considered so limited. One of ordinary skill in the art will recognize that enabling embodiments may be arranged to be partially deployed in cloud-based configurations with some elements in the cloud and some elements separate from cloud based resources. Likewise, enabling embodiments may be arranged to be deployed and operate in configurations entirely separate from cloud-based resources.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include server network device 112, host network device 114, enclosure of blade servers 110, enclosure of server computers 116, super computer network device 118, and the like. Although not shown, one or more mobile devices may be included in cloud network 102 in one or more arrangements to provide one or more network services to a user. Also, these arrangements of networked computing devices may or may not be mutually exclusive of each other.

Additionally, the user may employ a plurality of virtually any type of wired or wireless networked computing devices to communicate with cloud network 102 and access at least one of the network services enabled by one or more of arrangements 104 and 106. These networked computing devices may include tablet mobile device 122, handheld mobile device 124, wearable mobile device 126, desktop network device 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

One embodiment of a mobile device is described in more detail below in conjunction with FIG. 3. Generally, mobile devices may include virtually any substantially portable networked computing device capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), 5th (5G) generation wireless access technologies, and the like, for mobile devices. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, SMS, HSDPA, and the like.

Enclosure of Blade Servers

Figure 2A:
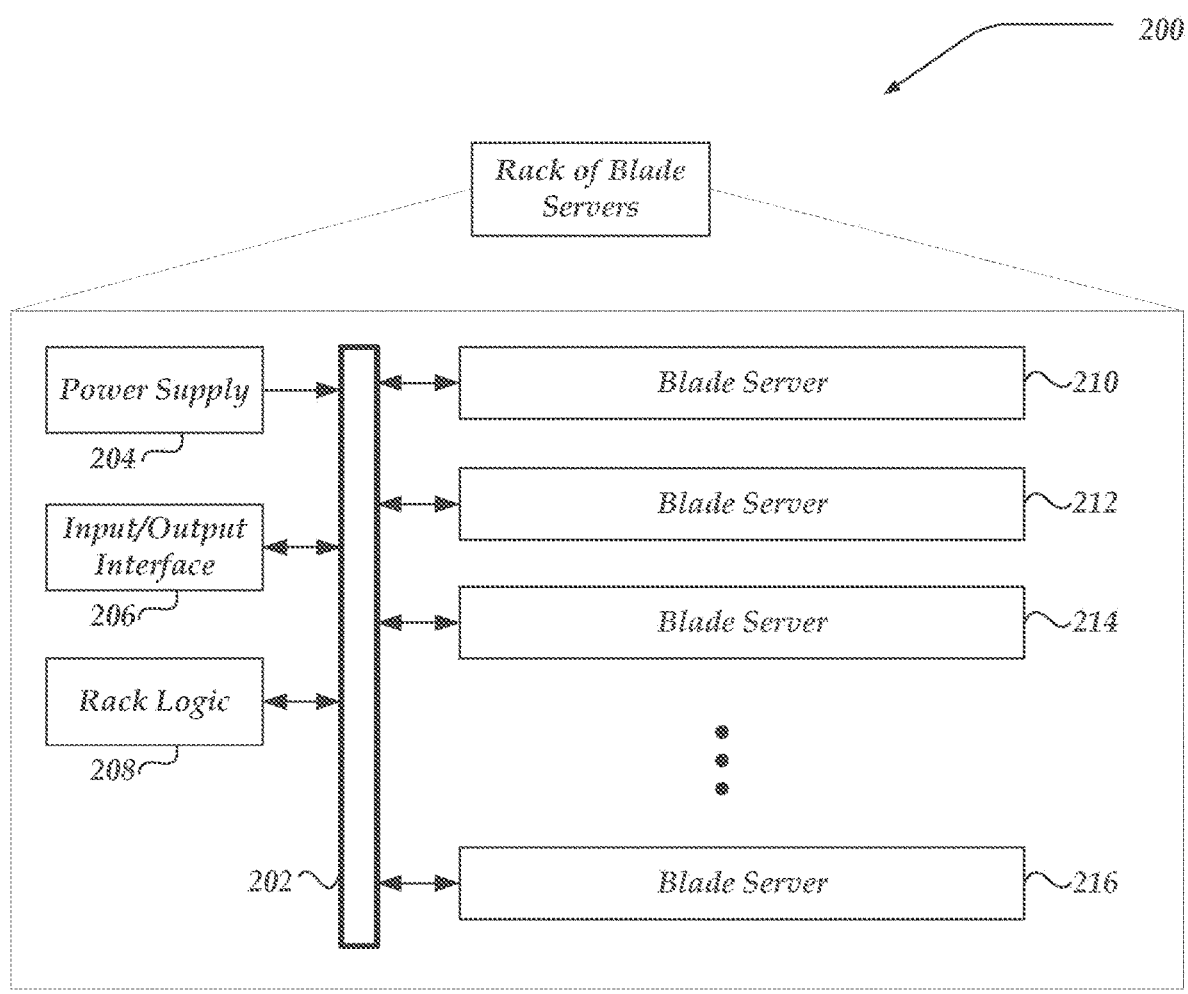
FIG. 2A shows a rack of blade servers that may be included in various embodiments.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that merely require a network connection and a power cord connection to operate. Each server computer often includes redundant components for power and interfaces.

As shown in the figure, enclosure 200 contains power supply 204, and input/output interface 206, rack logic 208, several blade servers 210, 212, 214, and 216, and backplane 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
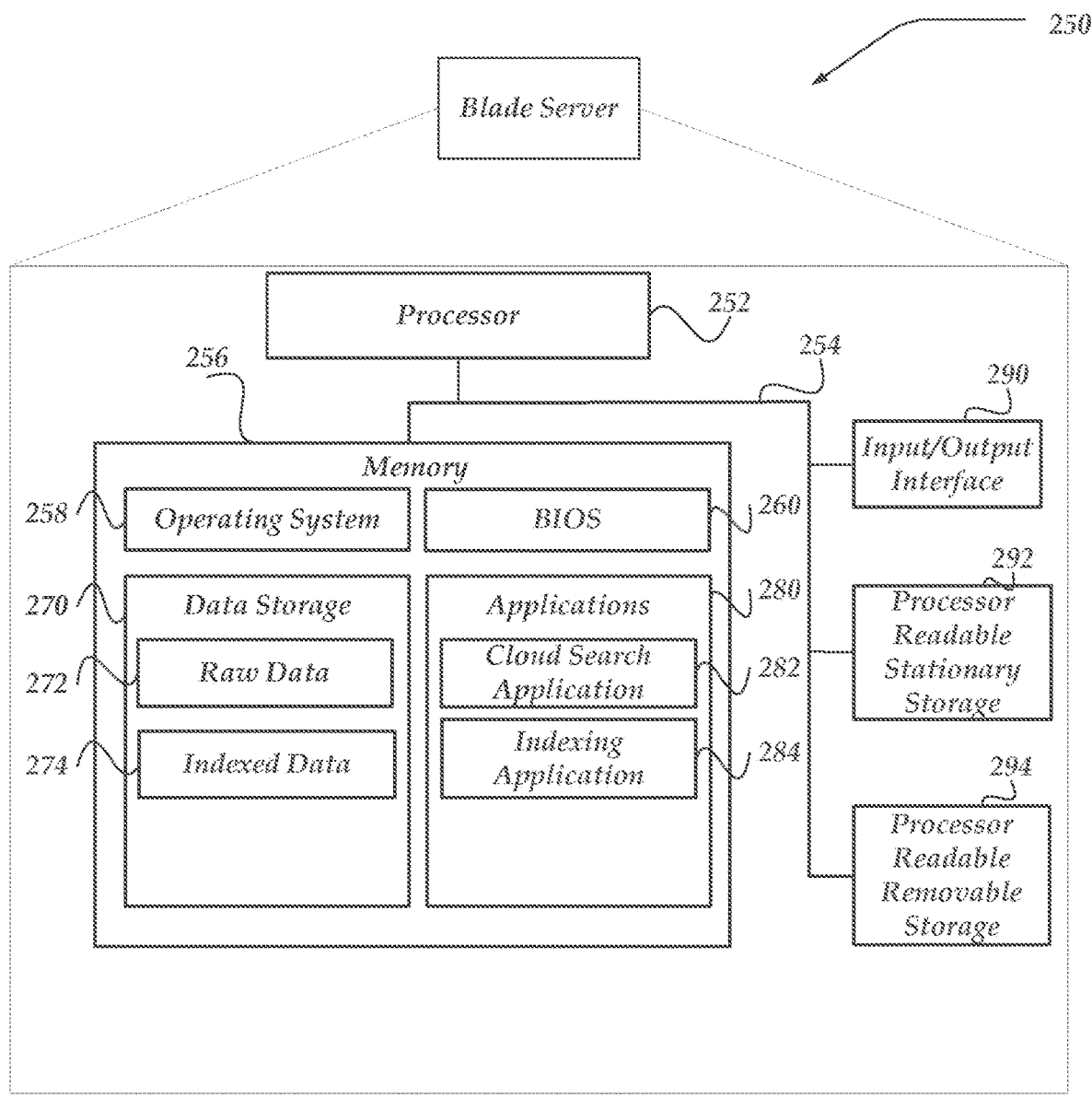
FIG. 2B illustrates an embodiment of a blade server that may be included in a rack of blade servers such as that shown in FIG. 2A.

FIG. 2B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 includes processor 252 which communicates with memory 256 via bus 254. Blade server 250 also includes input/output interface 290, processor-readable stationary storage device 292, and processor-readable removable storage device 294. Input/output interface 290 can enable blade server 250 to communicate with other blade servers, mobile devices, network devices, and the like. Interface 190 may provide wireless and/or wired communication links for blade server. Processor-readable stationary storage device 292 may include devices such as an electromagnetic storage device (hard disk), solid state hard disk (SSD), hybrid of both an SSD and a hard disk, and the like. Also, processor-readable removable storage device 294 enables processor 252 to read non-transitive storage media for storing and accessing processor-readable instructions, modules, data structures, and other forms of data. The non-transitive storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, or LINUXTM, or a specialized server operating system such as Microsoft's Windows Server™ and Apple Computer's IoS Server™.

Memory 256 further includes one or more data storage 270, which can be utilized by blade server 250 to store, among other things, applications 280 and/or other data. Data stores 270 may include program code, data, algorithms, and the like, for use by processor 252 to execute and perform actions. In one embodiment, at least some of data store 270 might also be stored on another component of blade server 250, including, but not limited to, processor-readable removable storage device 294, processor-readable stationary storage device 292, or any other processor-readable storage device (not shown). Data storage 270 may include, for example, raw data 272, and indexed data 274.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, cloud search application 282, and indexing application 284.

Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Illustrative Mobile Device

Figure 3:
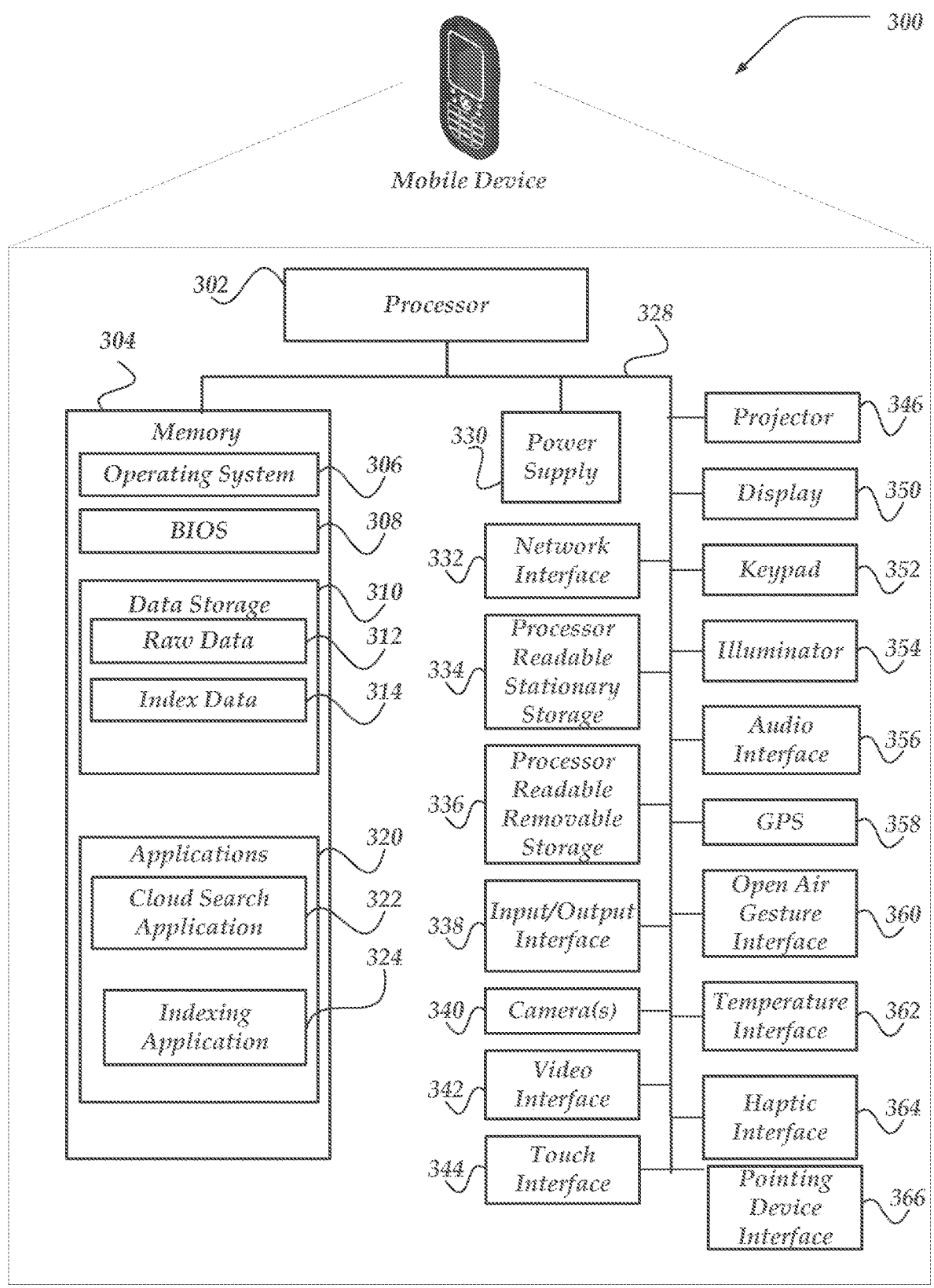
FIG. 3 shows a mobile device that may be included in various embodiments.

FIG. 3 shows one embodiment of mobile device 300 that may include many more or less components than those shown. Mobile device 300 may represent, for example, at least one embodiment of mobile devices shown in FIG. 1.

Mobile device 300 includes processor 302 in communication with memory 304 via bus 328. Mobile device 300 also includes power supply 330, network interface 332, audio interface 356, display 350, keypad 352, illuminator 354, video interface 342, input/output interface 338, haptic interface 364, global positioning systems (GPS) receiver 358, Open air gesture interface 360, temperature interface 362, camera(s) 340, projector 346, pointing device interface 366, processor-readable stationary storage device 334, and processor-readable removable storage device 336. Power supply 330 provides power to mobile device 300. A rechargeable or non-rechargeable battery may be used to provide power. The power may also be provided by an external power source, such as an AC adapter or a powered docking cradle that supplements and/or recharges the battery. And in one embodiment, although not shown, a gyroscope may be employed within mobile device 300 to measuring and/or maintaining an orientation of mobile device 300.

Mobile device 300 may optionally communicate with a base station (not shown), or directly with another computing device. Network interface 332 includes circuitry for coupling mobile device 300 to one or more networks, and is constructed for use with one or more communication protocols and technologies including, but not limited to, protocols and technologies that implement any portion of the Open Systems Interconnection (OSI) model for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wireless communication protocols. Network interface 332 is sometimes known as a transceiver, transceiving device, or network interface card (NIC).

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of mobile device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures. Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images. Illuminator 354 may provide a status indication and/or provide light. Illuminator 354 may remain active for specific periods of time or in response to events. For example, when illuminator 354 is active, it may backlight the buttons on keypad 352 and stay on while the mobile device is powered. Also, illuminator 354 may backlight these buttons in various patterns when particular actions are performed, such as dialing another mobile device. Illuminator 354 may also cause light sources positioned within a transparent or translucent case of the mobile device to illuminate in response to actions.

Mobile device 300 also comprises input/output interface 338 for communicating with external peripheral devices or other computing devices such as other mobile devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like. Haptic interface 364 is arranged to provide tactile feedback to a user of the mobile device. For example, the haptic interface 364 may be employed to vibrate mobile device 300 in a particular way when another user of a computing device is calling. Temperature interface 362 may be used to provide a temperature measurement input and/or a temperature changing output to a user of mobile device 300. Open air gesture interface 360 may sense physical gestures of a user of mobile device 300, for example, by using single or stereo video cameras, radar, a gyroscopic sensor inside a device held or worn by the user, or the like. Camera 340 may be used to track physical eye movements of a user of mobile device 300.

GPS transceiver 358 can determine the physical coordinates of mobile device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile device 300 on the surface of the Earth. It is understood that under different conditions, GPS transceiver 358 can determine a physical location for mobile device 300. In at least one embodiment, however, mobile device 300 may, through other components, provide other information that may be employed to determine a physical location of the device, including for example, a Media Access Control (MAC) address, IP address, and the like.

Human interface components can be peripheral devices that are physically separate from mobile device 300, allowing for remote input and/or output to mobile device 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile device with such peripheral human interface components is a wearable computing device, which might include a remote pico projector along with one or more cameras that remotely communicate with a separately located mobile device to sense a user's gestures toward portions of an image projected by the pico projector onto a reflected surface such as a wall or the user's hand.

A mobile device may include a browser application that is configured to receive and to send web pages, web-based messages, graphics, text, multimedia, and the like. The mobile device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of mobile device 300. The memory also stores an operating system 306 for controlling the operation of mobile device 300. It will be appreciated that this component may include a general-purpose operating system such as a version of UNIX, or LINUXTM, or a specialized mobile computer communication operating system such as Windows Mobile™, or the Symbian® operating system. The operating system may include, or interface with a Java virtual machine module that enables control of hardware components and/or operating system operations via Java application programs.

Memory 304 further includes one or more data storage 310, which can be utilized by mobile device 300 to store, among other things, applications 320 and/or other data. For example, data storage 310 may also be employed to store information that describes various capabilities of mobile device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of mobile device 300, including, but not limited to, non-transitory processor-readable removable storage device 336, processor-readable stationary storage device 334, or even external to the mobile device. Data storage 310 may include, for example, raw data 312, and index data 314.

Applications 320 may include computer executable instructions which, when executed by mobile device 300, transmit, receive, and/or otherwise process instructions and data. Applications 320 may include, for example, Cloud Search application 322, and Indexing Application 324. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Illustrative Network Device

Figure 4:
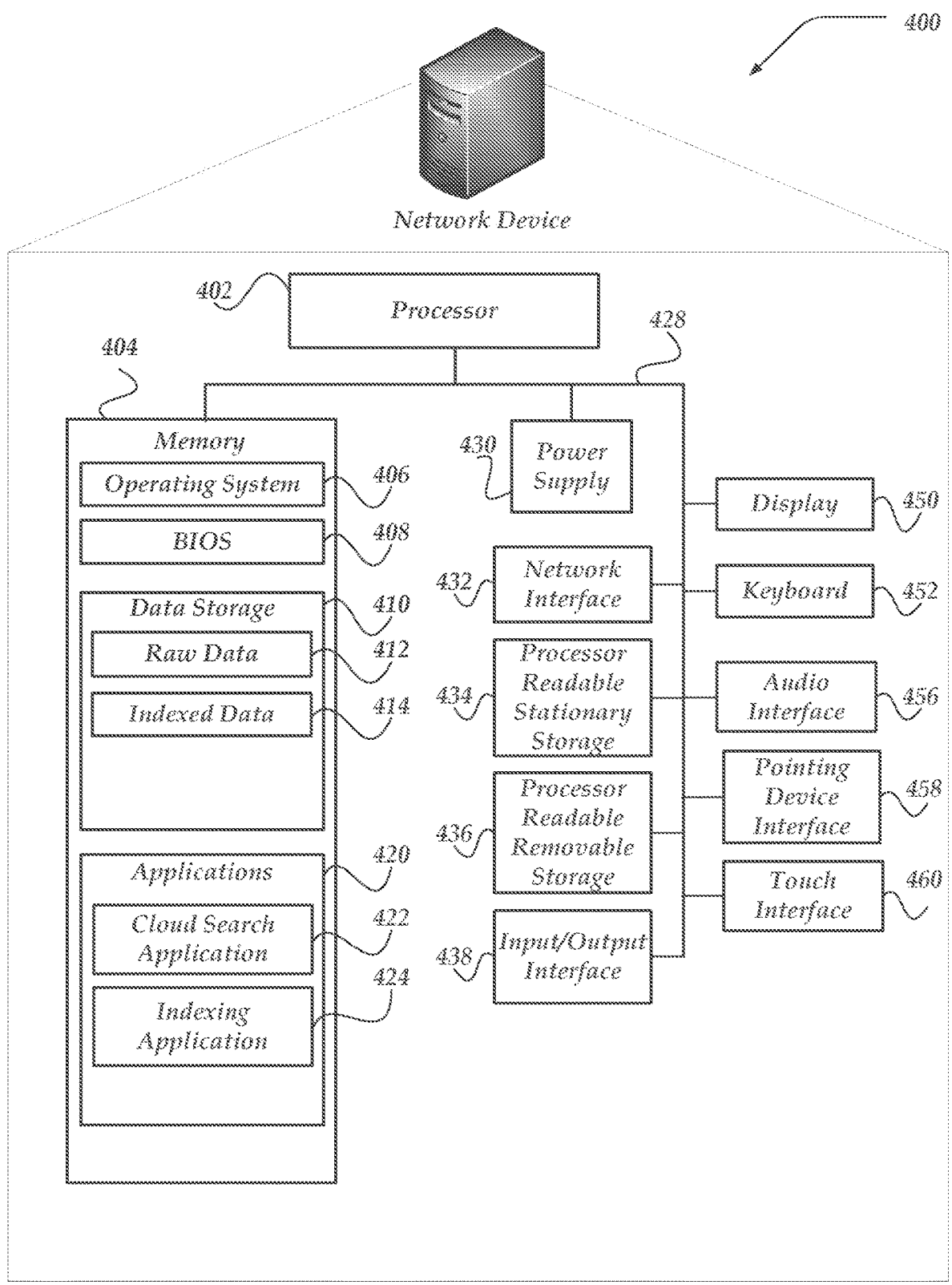
FIG. 4 illustrates a network device that may be included in various embodiments.

FIG. 4 shows one embodiment of network device 400 that may be included in a system implementing the invention. Network device 400 may include many more or less components than those shown in FIG. 4. However, the components shown are sufficient to disclose an illustrative embodiment for practicing the present invention. Network device 400 may represent, for example, one embodiment of at least one of network device 112, 114, or 120 of FIG. 1.

As shown in the figure, network device 400 includes a processor 402 in communication with a memory 404 via a bus 428. Network device 400 also includes a power supply 430, network interface 432, audio interface 456, display 450, keyboard 452, input/output interface 438, processor-readable stationary storage device 434, and processor-readable removable storage device 436. Power supply 430 provides power to network device 400.

Network interface 432 includes circuitry for coupling network device 400 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 432 is sometimes known as a transceiver, transceiving device, or network interface card (NIC). Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 also may also comprise input/output interface 438 for communicating with external devices not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components include any component that allows the computer to take input from, or send output to, a human user of a computer.

Memory 404 may include Random Access Memory (RAM), Read-Only Memory (ROM), and/or other types of memory. Memory 404 illustrates an example of computer-readable storage media (devices) for storage of information such as computer-readable instructions, data structures, program modules or other data. Memory 404 stores a basic input/output system (BIOS) 408 for controlling low-level operation of network device 400. The memory also stores an operating system 406 for controlling the operation of network device 400. It will be appreciated that this component may include a general-purpose operating system such as a version of UNIX, or LINUXTM, or a specialized operating system such as Microsoft Corporation's Windows® operating system, or the Apple Corporation's iOS® operating system. The operating system may include, or interface with a Java virtual machine module that enables control of hardware components and/or operating system operations via Java application programs.

Memory 404 further includes one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data stores 410 may further include program code, data, algorithms, and the like, for use by a processor, such as processor 402 to execute and perform actions. In one embodiment, at least some of data store 410 might also be stored on another component of network device 400, including, but not limited to, non-transitory media inside processor-readable removable storage device 436, processor-readable stationary storage device 434, or any other computer-readable storage device within network device 400, or even external to network device 400. Data storage 410 may include, for example, raw data 412, and indexed data 414.

Applications 420 may include computer executable instructions which, when executed by network device 400, transmit, receive, and/or otherwise process messages (e.g., SMS, Multimedia Messaging Service (MMS), Instant Message (IM), email, and/or other messages), audio, video, and enable telecommunication with another user of another mobile device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include, for example, cloud search application 422, and indexing application 424.

Illustrative System Diagram

Figure 5:
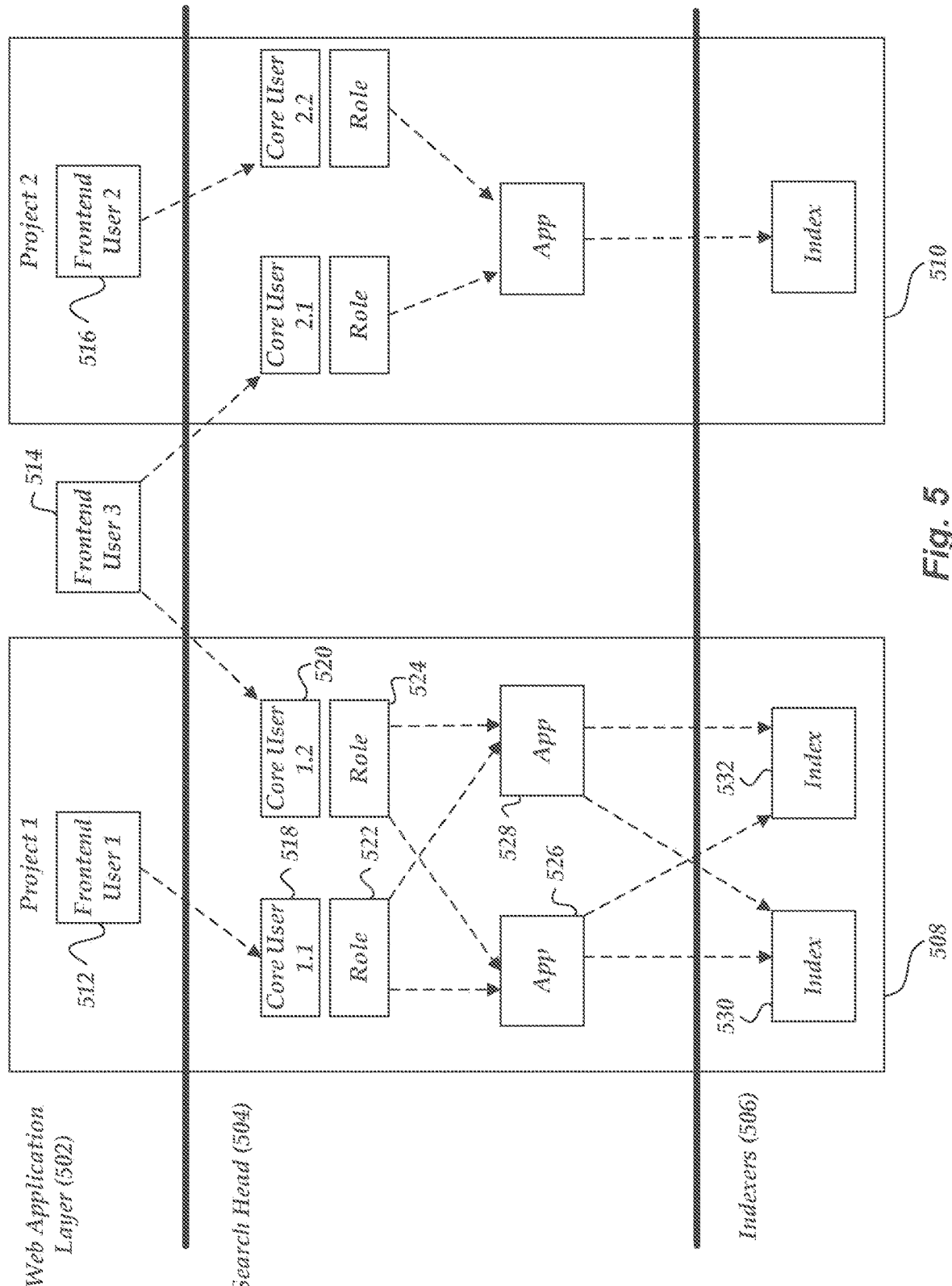
FIG. 5 illustrates a system diagram showing an embodiment of a system that may be utilized to implement embodiments of processing, searching and managing data volumes.

FIG. 5 depicts an embodiment where the top layer of the figure, indicated as Web Application Layer 502, may represent a cloud-based front end that may abstract and enable access to the underlying cloud-hosted elements and objects that may be part of a multi-tenant application that may comprise Core User (e.g., Core User 518 and Core User 520), Roles (e.g., Role 522 and Role 524), and Apps (e.g., App 526 and App 528), indicated as the Search Head 504. The objects in the Search Head 504 layer may be employed to access the Index objects located in the Indexers 506 layer of FIG. 5. The two projects, Project 1 (i.e., project 508) and Project 2 (i.e., project 510) in the Web Application Layer 502 may be examples of projects that have been elastically scaled to provide resources that may meet the specific needs of each project. As depicted, Project 1 may require twice as much performance and Project 2, the figure represents this with the additional Apps (i.e., App 526 and App 528) in the Search Head 504 layer, and the two index stores (i.e., index 530 and index 532) in the Indexer 506 layer.

Also, the embodiment in FIG. 5, demonstrates that a Frontend User may have access to one or more Projects. For example, frontend user 512 may have access to project 508, Frontend User 516 may have access to project 510, and Frontend User 514 may have access to both project 508 and project 510. An embodiment may enable the Search Head 504 layer of a Project (e.g., project 508) to create unique Core Users in the Search Head 504 layer that may be linked to Frontend Users from the Web Application Layer 502. For example, Core User 518 may be linked to Frontend User 512 and Core User 520 may be linked to Frontend User 514.

A Role of the Core User that may be linked to the Frontend User may enable access control for the Apps and other objects within the Search Head layer. For example, Role 522 of Core User 518 may enable Frontend User 512 to access control for App 526 and App 528. Similarly, Role 524 of Core User 520 may enable Frontend User 514 to access control for App 526 and App 528. The Role may determine the specific features that are made available to a Core User, and a Frontend User may have its access within a Project controlled by the Role of the Core User it is linked with. In other words, as depicted by FIG. 5, the Roles may be thought of as providing pathways for the Frontend User to reach the Apps. In some embodiments, the Roles may also control access to indexers. For example, Role 522 may control access of Core User 518 to Apps 526 and/or 528 as well as index 530 and/or 532.

Figure 6:
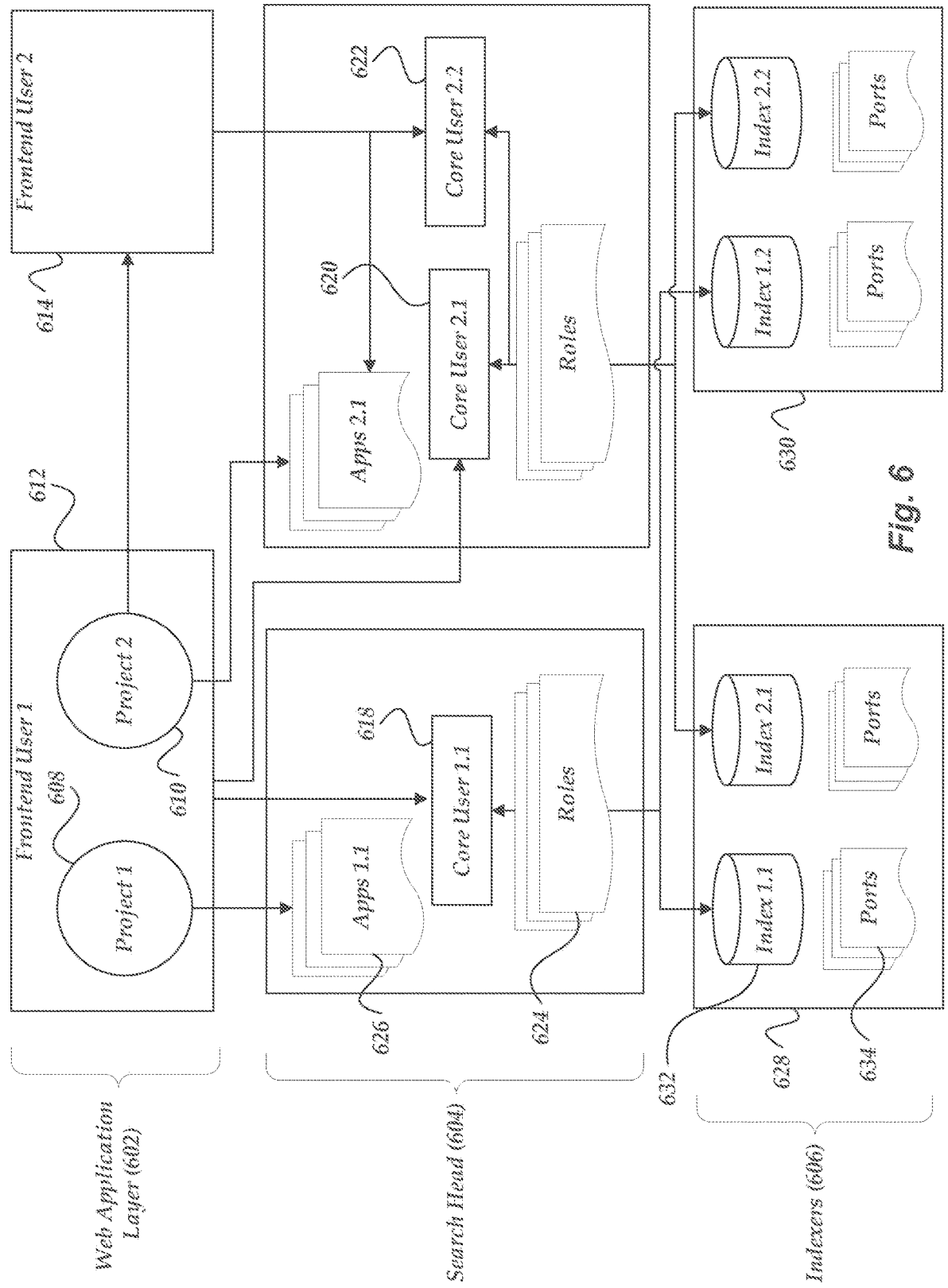
FIG. 6 illustrates a system diagram showing an alternative embodiment of a system that may be utilized to implement embodiments of processing, searching and managing data volumes.

FIG. 6, depicts an embodiment where Frontend User 1 (i.e., Frontend User 612) may be the owner of two projects, Project 1 (i.e., Project 608) and Project 2 (i.e., Project 610). As shown in the figure, Frontend User 2 (i.e., Frontend User 614) may not be an owner of a project. But, Frontend User 2 illustrates how a Frontend User may be invited by a project owner, represented in this embodiment by the depicted Frontend User 1. In at least one embodiment, Frontend User 612 and/or Frontend User 614 may be an embodiment of a Frontend User from FIG. 5. In some embodiments, Project 608 and Project 610 may be embodiments of Project 508 and Project 510 of FIG. 5, respectively. Web Application Layer 602, Search Head 604, and Indexers 606 may be embodiments of Web Application Layer 502, Search Head 504, and Indexers 506 of FIG. 5, respectively.

Similar to the embodiment depicted in FIG. 5, this embodiment may enable unique Core Users to be created and linked to Frontend Users. For example, Core User 618 and Core User 620 may be linked to Frontend User 612 and Core User 622 may be linked to Frontend User 614. For each unique Core User, a Role may be created to define the features that may be accessed by the Frontend User. For example, Role 624 of Core User 618 may define the features that may be accessed by Frontend User 612 (e.g., App 626).

The embodiment depicted in FIG. 6, may also enable Indexes (e.g., Index 632), Ports (e.g., Port 634), and associated storage to be located separately from the Search Head/Core layer objects. Also, embodiments may locate Indexes, and Ports across more than one computing device e.g., computing device 628 and computing device 630), including, network computing devices, blade servers, individual blade computers, cloud-based compute instances, virtual machines, and the like. Further, Indexes that may be associated with different Projects may be co-located on the same computing device, such as, network computing devices, blade servers, individual blade computers, cloud-based compute instances, virtual machines, and the like.

General Operation of Data Volume Management

Figure 7:
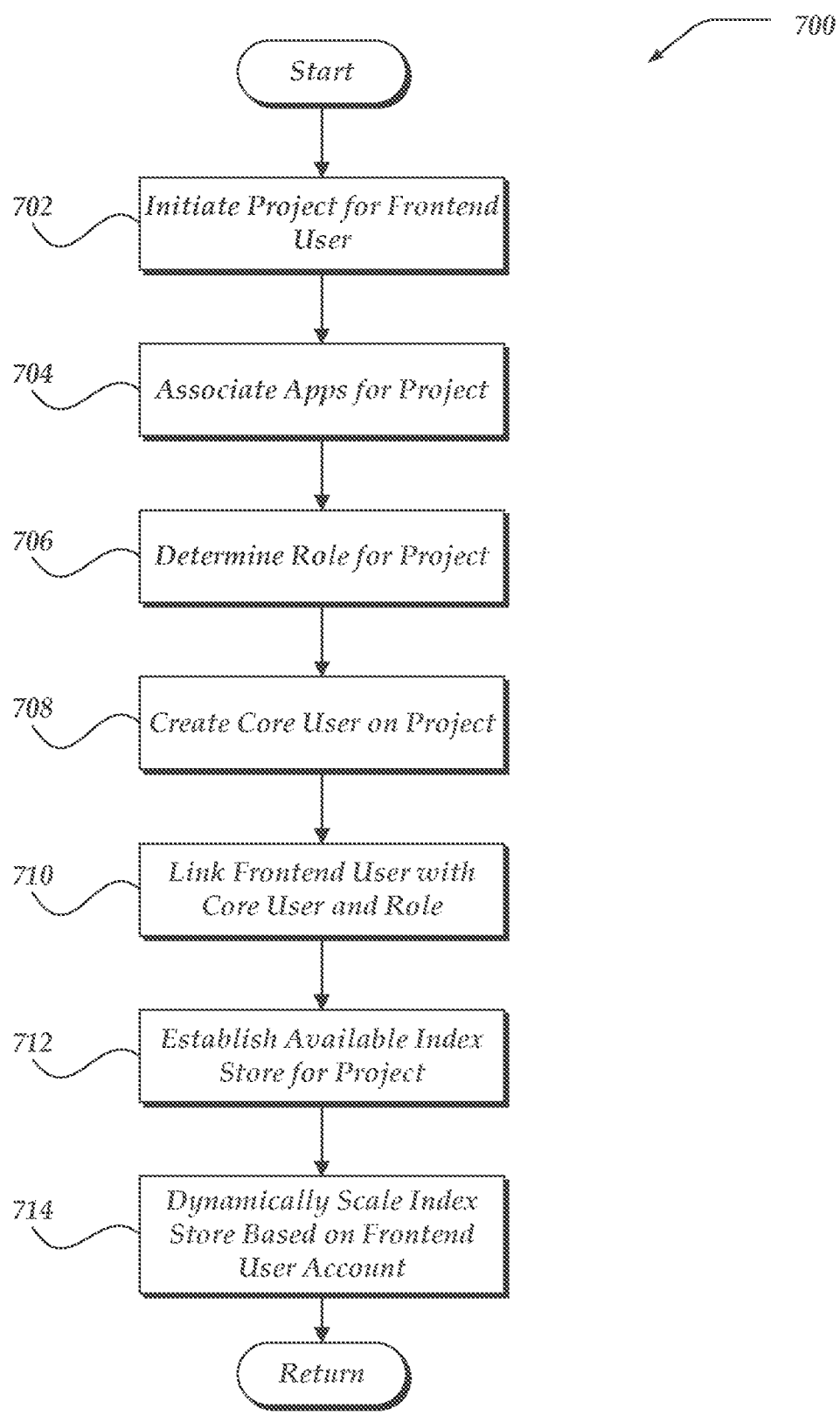
FIG. 7 illustrates a logical flow diagram generally showing one embodiment of an overview process for initiating a project that employs embodiments of the system diagrams shown in FIGS. 5 and/or 6.

The operation of certain aspects of the invention will now be described with respect to FIGS. 7-10. FIG. 7 illustrates a logical flow diagram generally showing one embodiment of an overview process for initiating a project that employs embodiments of the system diagrams shown in FIGS. 5 and/or 6. In some embodiments, process 700 of FIG. 7 may be implemented by and/or executed on a single network device, such as network device 400 of FIG. 4. In other embodiments, process 700 or portions of process 700 of FIG. 7 may be implemented by and/or executed on a plurality of network devices, such as network device 400 of FIG. 4. In yet other embodiments, process 700 or portions of process 700 of FIG. 7 may be implemented by and/or executed on one or more blade servers, such as blade server 250 of FIG. 2B.

Process 700 begins, after a start block, at block 702 where at least one project may be initialized for at least one Frontend User. In some embodiments, Roles, Apps, Indexes, or the like may be created and/or configured for each unique project. In some embodiments, blocks 704, 706, 708, 710, and 712 may be performed in an order other than illustrated in FIG. 7.

Processing continues at block 704, where one or more Apps may be created and/or associated with the project. In some embodiments, the associated Apps may be identified by the Frontend User.

Process 700 continues at block 706, where at least one Role may be determined for the project. In some embodiments, an operator and/or the Frontend User may generate and/or modify the access permissions associated with the Role. In at least one embodiment, at least one Role for each frontend user may be determined that may establish permissions for interacting with the at least one project and the at least one application for each Frontend User. In at least one embodiment, the Roles may configure access control for a Frontend User to the Apps and/or the indexers. For example, in some embodiments, Roles may enable one Frontend User to access one App (and/or indexer), but not another App (and/or indexer). In some embodiments, a plurality of Roles may be determined for each Core User.

Process 700 proceeds to block 708, where a Core User on the project may be created for the Frontend User. In at least one embodiment, creating a Core User may include determining a Core User that corresponds to a frontend user and a project, wherein the Core User enables the Frontend User to interact with the project. In some embodiments, the Core User may inherit one or more corresponding Roles determined at block 706.

Process 700 continues next at block 710, where the Frontend User may be linked with the Core User and the Role.

Process 700 proceeds to block 712, where an available index store may be established for the project. In at least one embodiment, an available index store may refer to an index store that is accessible by the Frontend User. In some embodiments, the Frontend User may be enabled to search the available index store. In at least one embodiment, the available index store may include one or more indexer instances. In some embodiments, the indexers may be configured based on the Roles. As described above, access to the index store (and/or the Apps) may be controlled by the Roles. In some other embodiments, a port may be assigned to each individual index.

Continuing to block 714, the index store may be dynamically scaled, which is described in more detail below in conjunction with FIG. 8. Briefly, however, the index store may be dynamically scaled based on the Frontend User account. For example, if the index store exceeds a pre-purchased data volume, then incoming data may continue to be index, but the Frontend User may not be able to access the incoming data until the Frontend User pays for an increase in the data volume.

In some embodiments, the Frontend User may be enabled to select when and/or how dynamic scaling may be employed. For example, in some embodiments, the Frontend User may determine that if an index size limit is reached, at least one of the following may occur, including: automatically deleting additional data provided for the project beyond the size limit, the indexers may automatically stop indexing data, automatically increasing the storage size of data supported for a project, or the like.

After block 714, process 700 may return control to a calling process.

Figure 8:
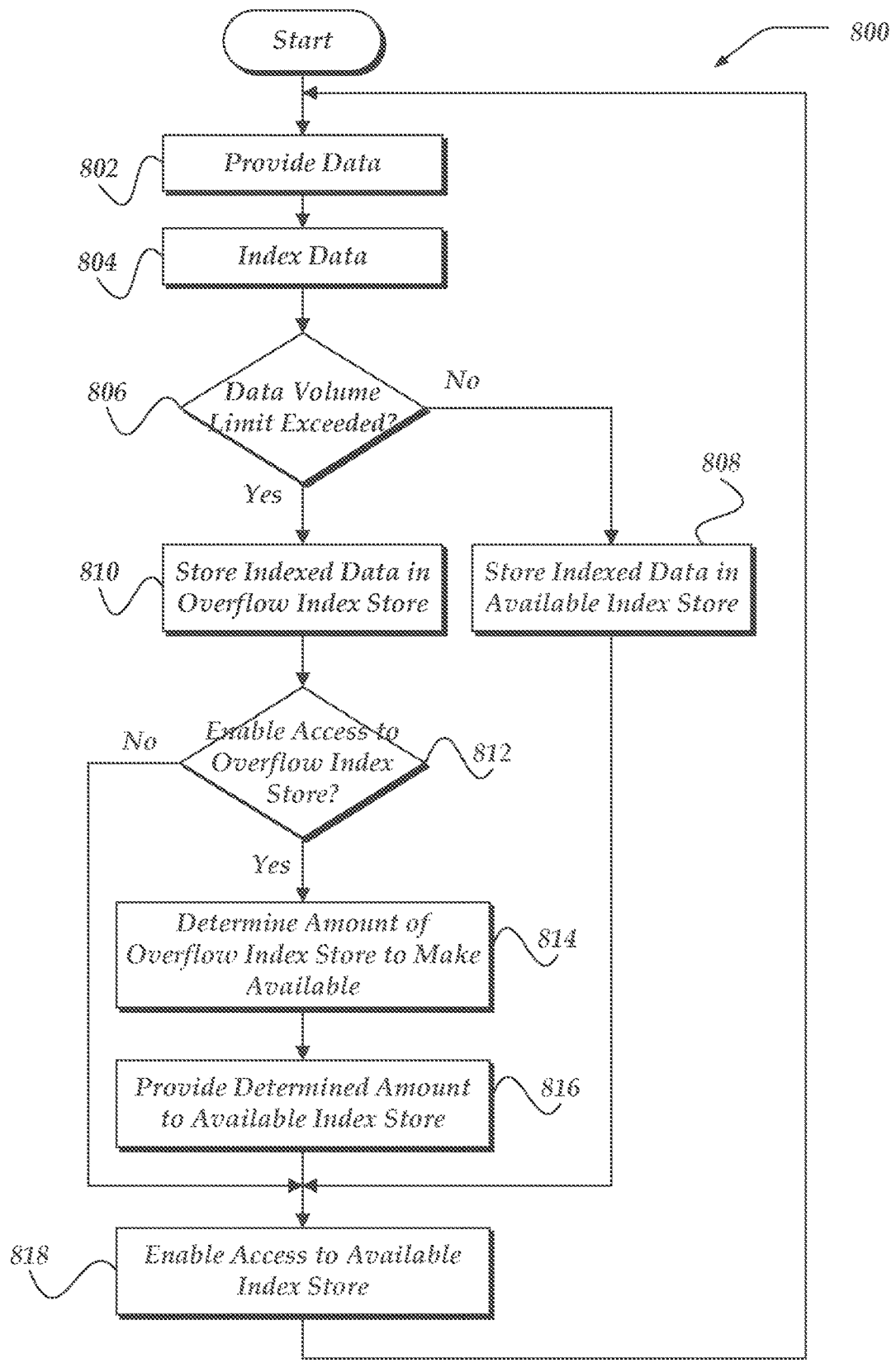
FIG. 8 illustrates a logical flow diagram generally showing one embodiment of a process for enabling access to a determined volume of data and restricting access to incoming data that exceeds the determined volume.

FIG. 8 illustrates a logical flow diagram generally showing one embodiment of a process for enabling access to a determined volume of data and restricting access to incoming data that exceeds the determined volume. In some embodiments, process 800 of FIG. 8 may be implemented by and/or executed on a single network device, such as network device 400 of FIG. 4. In other embodiments, process 800 or portions of process 800 of FIG. 8 may be implemented by and/or executed on a plurality of network devices, such as network device 400 of FIG. 4. In yet other embodiments, process 800 or portions of process 800 of FIG. 8 may be implemented by and/or executed on one or more blade servers, such as blade server 250 of FIG. 2B.

Process 800 begins, after a start block, at block 802, data may be provided. In some embodiments, the data may be incoming data for a given project. In other embodiments, the data may be archived data for a given project that may be recovered.

Process 800 continues at block 804, where the data may be indexed.

Process 800 proceeds to decision block 806, where a determination may be made whether a data volume limit is exceeded by the indexed data. In one embodiment, each project may include a data volume limit. In another embodiment, each frontend user (or group of frontend users) may be associated with a data volume limit. In at least one embodiment, the total stored data plus the indexed data may be compared to a maximum allowable data volume limit. In some embodiment, the data volume limit may be based on an amount of storage space purchased by a user (e.g., a Frontend User). If the data volume limit is exceeded, then process 800 may flow to block 810; otherwise, process 800 may flow to block 808.

At block 808, the indexed data may be stored in an available index store. In some embodiments, an available index store may refer to an index store that is accessible to the user. Process 800 may proceed to block 818.

If, at decision block 806, the data volume limit is exceeded, then process 800 may flow from decision block 806 to block 810. At block 810, the indexed data may be stored in an overflow index store. In some embodiments, the overflow index store may be unavailable to the user. The overflow index store allows continued indexing of a user's data even if the amount of data has exceeded a purchased maximum data volume. However, the user may not have access to the data in the overflow index store, unless the user purchases additional data volume.

In at least one embodiment, the overflow index store may be a FIFO buffer. The data in the overflow index store may remain in the overflow index store until a user purchases additional data volume and/or the data is removed (e.g., deleted/archived) after a predetermined amount of time.

Some embodiments for removing data from the overflow index store are described in more detail below in conjunction with FIG. 9.

In any event, process 800 next flows to decision block 812, where a determination may be made whether access to data in the overflow index store is enabled. In some embodiments, access may be enabled if the user increases the data storage volume, such as by purchasing additional data storage. In at least one embodiment, the data storage volume may be elastically scaled as described in more detail below in conjunction with FIGS. 11-23. If access to the overflow index store is enabled, process 800 may flow to block 814; otherwise, process 800 may flow to block 818.

At block 814, an amount of data in the overflow index store to make available may be determined. In some embodiments, the amount of data may be equal to or less than an increase in data storage volume. For example, if the user purchases an extra 2 GB of data storage, then it may be determined that up to 2 GB of data from the overflow index store may be made available. In some embodiments, the determined amount of data may be pulled from the overflow index store based on a FIFO (first in first out) buffer architecture of the overflow index store. In some embodiment, the indexed data that exceeds the data volume limit of the available index store is automatically deleted based on at least one of a first in first out operation of the overflow index store or any indexed data that exceeds the data volume limit.

Process 800 proceeds to block 816, where the determined amount of data may be provided to the available index store. In at least one embodiment, determining an amount of indexed data to copy from the overflow index store to the index store based on at least an increase to the data volume limit. In another embodiment, providing the data from the overflow index store to the available index store may include modifying an index store flag; copying the data from the overflow index store to the available index store, or the like. In some embodiments, at least a portion of the indexed data in the overflow index store may be copied to archival storage. For example, the indexed data provided from the overflow index store to the available index store may also be provided to and/or copied to archival storage.

Process 800 continues next at block 818, where the user may be enabled to access the available index store. In at least one embodiment, the user may be enabled to perform searches for data in the available index store.

After block 800, process 800 may return control to a calling process.

Figure 9:
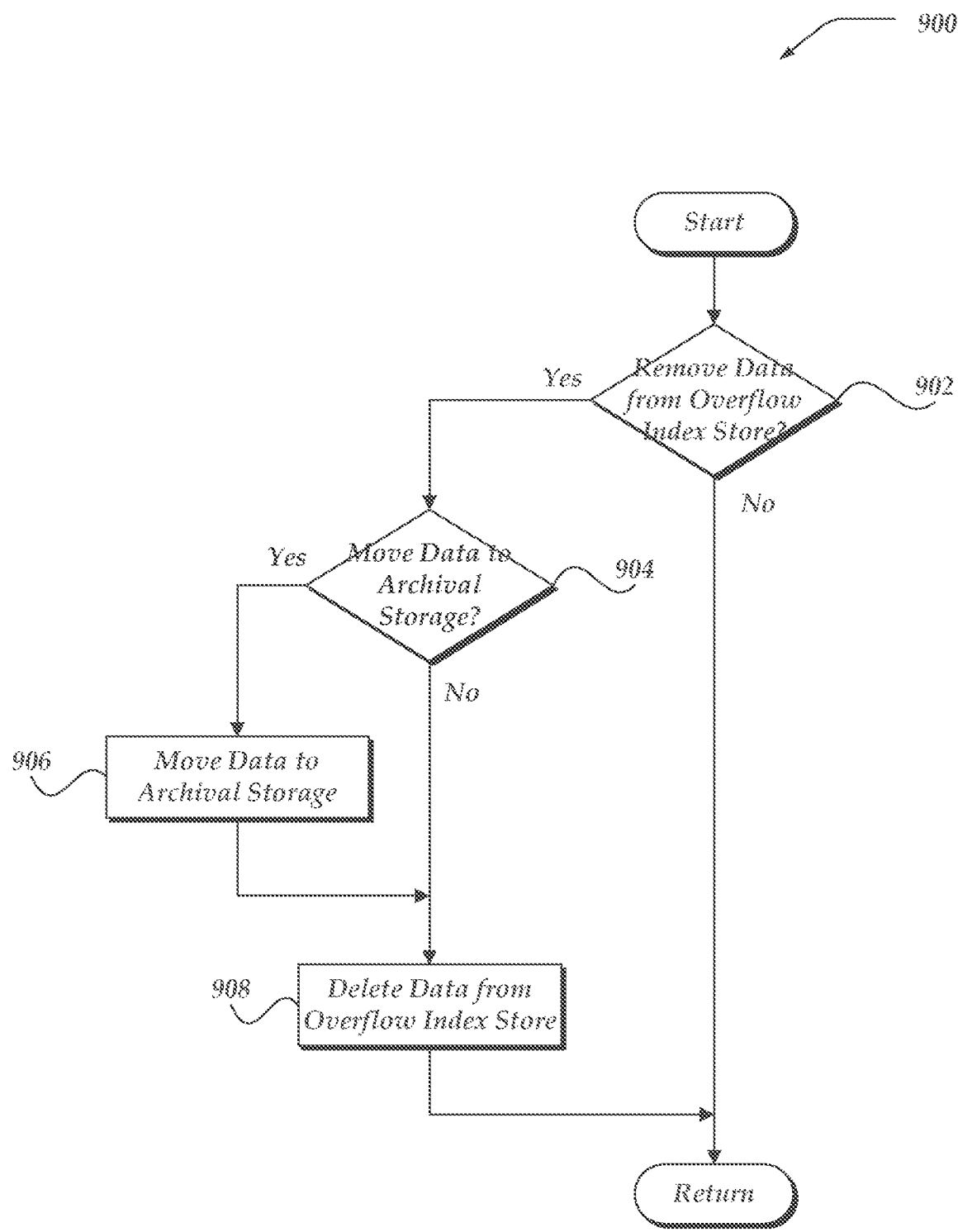
FIG. 9 illustrates a logical flow diagram generally showing one embodiment of a process for managing an overflow index store.

FIG. 9 illustrates a logical flow diagram generally showing one embodiment of a process for managing an overflow index store. In some embodiments, process 900 of FIG. 9 may be implemented by and/or executed on a single network device, such as network device 400 of FIG. 4. In other embodiments, process 900 or portions of process 900 of FIG. 9 may be implemented by and/or executed on a plurality of network devices, such as network device 400 of FIG. 4. In yet other embodiments, process 900 or portions of process 900 of FIG. 9 may be implemented by and/or executed on one or more blade servers, such as blade server 250 of FIG. 2B.

Process 900 begins, after a start block, at decision block 902, where a determination may be made whether to remove data from the overflow index store. In some embodiments, data may be removed from the overflow index store when it is moved to the available index store. In other embodiments, data may be removed from the overflow index store after a predetermined amount of time. In yet other embodiments, data may be removed from the overflow index store if the amount of data in overflow index store exceeds a maximum overflow index store volume. If data is removed from the overflow index store, then process 900 may flow to decision block 904; otherwise, process 900 may return control to a calling process.

At decision block 904, a determination may be made whether the removed data is moved to archival storage. In some embodiments, this determination may be based on user preferences, settings, rules (e.g., Roles), or the like. For example, an account for the user may indicate that the data removed from the overflow index store may be deleted without archiving the data. In other embodiments, the determination may be based on whether the data was added to the available index store at block 816 of FIG. 8. In one such embodiment, if the data was added to the available index store, then the data may be moved to archival storage. If the data is moved to archival storage, then process 900 may flow to block 906; otherwise, process 900 may flow to block 908.

At block 906, data may be moved from the overflow index store to archival storage. In one embodiment, data may be moved to the archival storage based on a FIFO buffer architecture of the overflow index store. In some embodiments, an amount of data to be moved to the archival storage may be based on the FIFO buffer. In other embodiments, the amount of data to be moved may be based on an amount of data added to the available index store at block 816 of FIG. 8.

Process 900 proceeds to block 908, where data may be deleted from the overflow index store. In one embodiment, data may be deleted based on a FIFO buffer architecture of the overflow index store. In some embodiments, an amount of data to be deleted may be based on the FIFO buffer. In other embodiments, the amount of data to be deleted may be based on an amount of data added to the available index store at block 816 of FIG. 8.

After block 908, process 900 may return control to a calling process.

Figure 10:
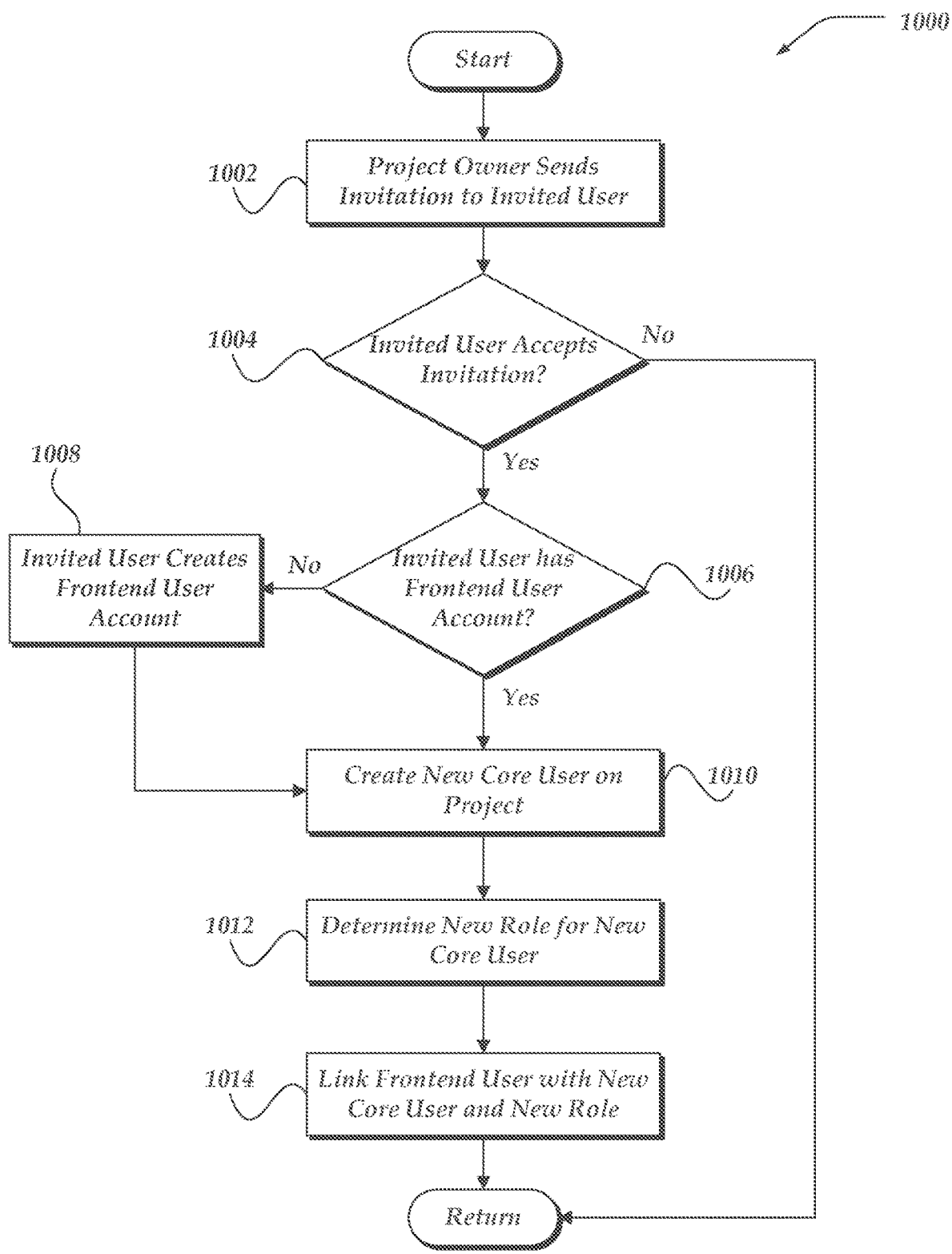
FIG. 10 illustrates a logical flow diagram generally showing one embodiment of a process for enabling a project owner to invite another user into the project.

FIG. 10, illustrates a logical flow diagram generally showing one embodiment of a process for enabling a project owner to invite another user into the project. In some embodiments, process 1000 of FIG. 10 may be implemented by and/or executed on a single network device, such as network device 400 of FIG. 4. In other embodiments, process 1000 or portions of process 1000 of FIG. 10 may be implemented by and/or executed on a plurality of network devices, such as network device 400 of FIG. 4. In yet other embodiments, process 1000 or portions of process 1000 of FIG. 10 may be implemented by and/or executed on one or more blade servers, such as blade server 250 of FIG. 2B.

Process 1000 begins, after a start block, at block 1002, where a project owner may be enabled to send an invitation to an invited user. Also, any project user, or administrative user having the authority to invite users to a particular project may send invitations. Further, though not depicted in FIG. 10, administrators, or other authorized users may define negative or positive restrictions on the users that may be invited to project. Restrictions may be defined for many purposes including, project security, privacy, licensing, and the like. Restrictions may be based on individual users as well as groups, lists, patterns, and the like.

Process 1000 proceeds to decision block 1004, where a determination may be made whether a user accepted the invitation. In at least one embodiment, an invited user may have the choice to accept the invitation. However, some embodiments may automatically join invited users to a project without giving them the option to decline the invitation. If an invited user declines or ignores an invitation, then process 1000 may return to the calling process; otherwise, process 1000 may flow to decision block 1006. In some embodiments the sender of the invitation may receive notice that the invitation has been declined or ignored.

At decision block 1006, a determination may be made whether the invited user has a Frontend User account. If the invited user has an active Frontend User account, then process 1000 may flow to block 1010; otherwise, process 1000 may flow to block 1008.

At block 1008, the invited user may create a Frontend User account.

Processing continues at block 1010, where a new Core User on a project may be creased. Proceeding to block 1012, a corresponding new Role for the new Core User may also be determined. In some embodiments, one or more new Roles may be created for the new Core User. In other embodiments, the new Core User may inherit one or more Roles from the user who initiated in invitation.

Process 1000 proceeds to block 1014, where the invited Frontend User may be linked with the new Core User and the new Role. After block 1014, process 1000 may return control to a calling process.

General Operation of Elastic Scaling of Data Volumes

Figure 11:
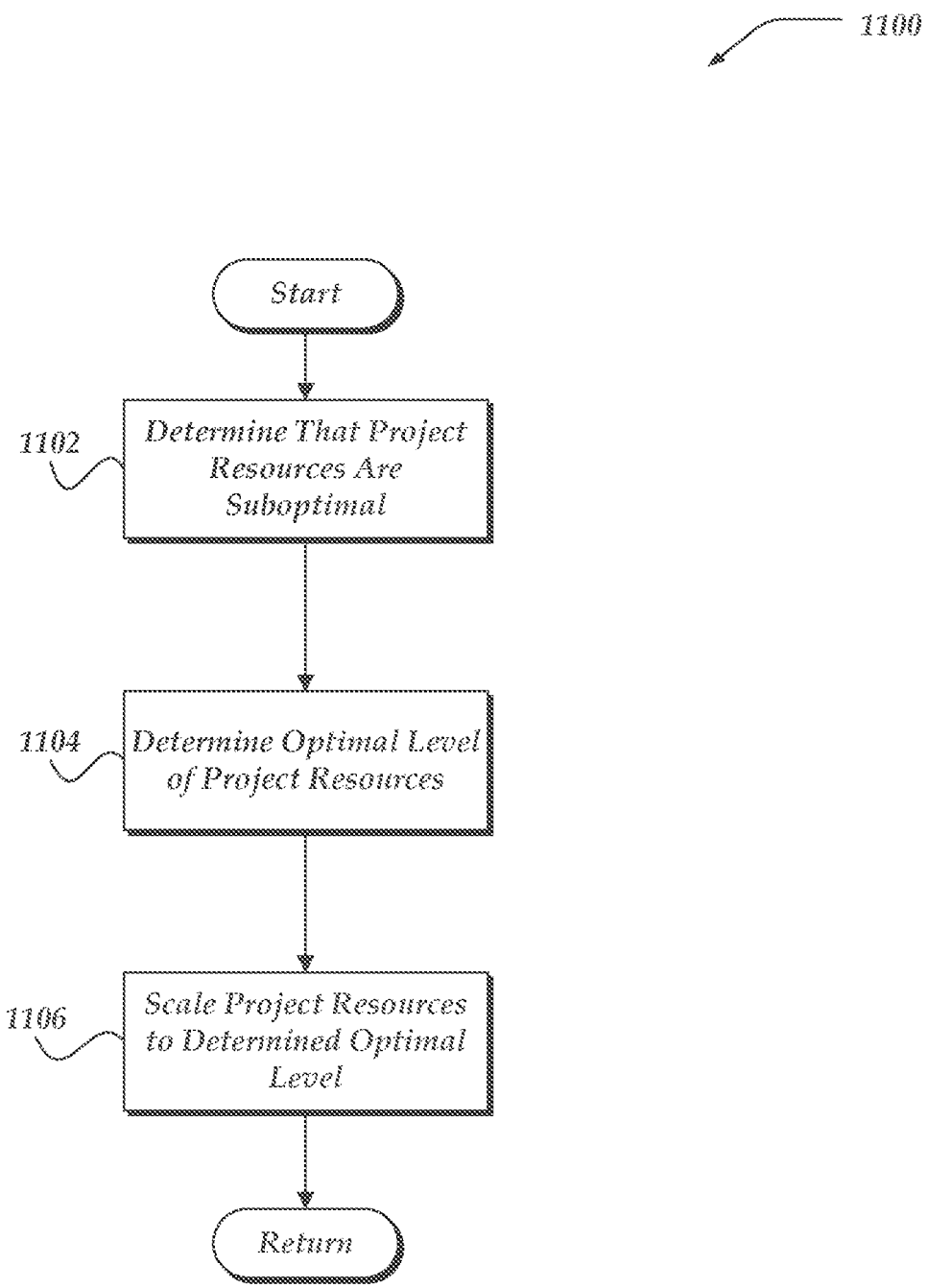
FIG. 11 illustrates a logical flow diagram generally showing one embodiment of an overview process for elastically scaling a project.

The operation of certain aspects of the invention will now be described with respect to FIGS. 11-22. FIG. 11 illustrates a logical flow diagram generally showing one embodiment of an overview process for elastically scaling a project. In some embodiments, process 1100 of FIG. 11 may be implemented by and/or executed on a single network device, such as network device 400 of FIG. 4. In other embodiments, process 1100 or portions of process 1100 of FIG. 11 may be implemented by and/or executed on a plurality of network devices, such as network device 400 of FIG. 4. In yet other embodiments, process 1100 or portions of process 1100 of FIG. 11 may be implemented by and/or executed on one or more blade servers, such as blade server 250 of FIG. 2B.

Process 1100 begins, after a start block, at block 1102, where resources allocated for use by the Project may be determined to be sub-optimal. Such a determination may be made by many methods, including, rule-based systems, or manual systems. Embodiments may apply various rule-based systems that may enable determining that a project is operating with suboptimal resources. Such rule-based systems may include, detecting if a performance metric threshold has been exceeded, triggering resource allocations based on schedule, triggering resource allocations based on pattern prediction that may indicate a potential change in utilization requirements, and the like. In addition, an operator may determine by observation that resources are suboptimal.

Process 1100 next proceeds to block 1104, where, the optimal level of project resources may be determined. In some embodiments, optimal resources may be static or dynamic. In at least one embodiment, optimal resources may be automatically determined by rule-based systems, predictive computing techniques, or the like. In another embodiment, optimal resources may be manually determined by an operator. The specific allocation of resources may be determined in part by the characteristics of the project, or they may be determined by factors external to project. For example, a project that requires a very large dataset may have an optimal resource allocation that emphasizes increased data storage volume over processor performance.

Process 1100 continues at block 1106, where the project resources may be scaled to support the determined optimal level. Additional non-limiting embodiments of elastic scaling of project resources are described below. After block 1106, process 1100 may return control to a calling process.

Figure 12:
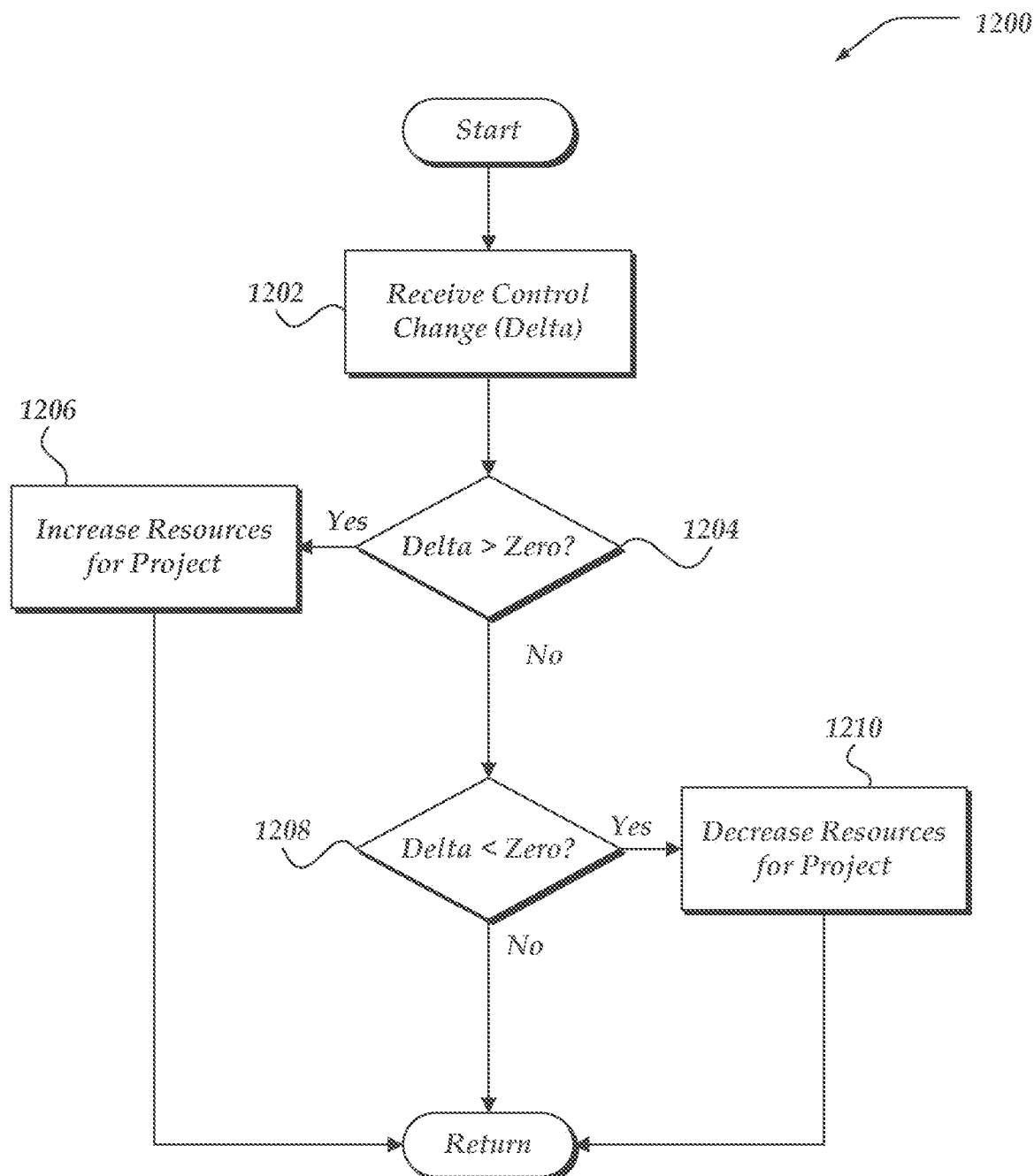
FIG. 12 illustrates a logical flow diagram generally showing one embodiment of a process for receiving resource allocation direction from an operator manipulating a user interface control.

FIG. 12 illustrates a logical flow diagram generally showing one embodiment of a process for receiving resource allocation direction from an operator manipulating a user interface control. In some embodiments, process 1200 of FIG. 12 may be implemented by and/or executed on a single network device, such as network device 400 of FIG. 4. In other embodiments, process 1200 or portions of process 1200 of FIG. 12 may be implemented by and/or executed on a plurality of network devices, such as network device 400 of FIG. 4. In yet other embodiments, process 1200 or portions of process 1200 of FIG. 12 may be implemented by and/or executed on one or more blade servers, such as blade server 250 of FIG. 2B.

The user interface control may have a user interface that represents a slider, dial, selection lists, radio buttons, check boxes, and the like. Embodiments may be arranged to map various elastic scaling dimensions to a control. For example, a control may represent processing performance, index storage, time-window of received data, and the like. An embodiment of a use case of a slider user interface is described in more detail below in conjunction with FIG. 23.

Process 1200 begins, after a start block, at block 1202, where a control change (delta) may be received. In at least one embodiment, an operator may change, or manipulate the control to provide the delta. In some embodiments, a signal, message, or notification from the control may be received indicating that a change in the control may have occurred (i.e., the delta).

Process 1200 proceeds next to decision block 1204, where a determination may be made whether the delta is greater than zero. In at least one embodiment, a delta greater than zero may indicate a request to increase resources for the instant project. If the delta is greater than zero, then process 1200 may flow to block 1206; otherwise, process 1200 may flow to decision block 1208.

At block 1206, the resources for the project may be increased. One embodiment of a process for increasing resources for a project is described in more detail below in conjunction with FIG. 13. After block 1206, process 1200 may return control to a calling process.

If, at decision block 1204, the delta is not greater than zero, then processing may flow from decision block 1204 to decision block 1208. At decision block 1208 a determination may be made whether the delta is less than zero. In at least one embodiment, a delta less than zero may indicate a request to decrease resources for the instant project. If the delta is less than zero, then process 1200 may flow to block 1210; otherwise, process 1200 may return control to a calling process.

At block 1210, the resources for the project may be decreased. One embodiment of a process for decreasing resources for a project is described in more detail below in conjunction with FIG. 10.

Note, the concept of increasing or decreasing resources as used herein is generalized to refer to increasing or decreasing project resources in a defined and configured "dimension." Thus, it is important to recognize that increasing project resources in a particular defined dimension may actually require some computing resources to be increased while other may be decreased. For example, if for an embodiment, a single project resource elastic scaling dimension has been arranged such the increasing a slider (delta>zero) means to emphasize storage and de-emphasize processing speed, then the effect may be to increase storage and reduce the CPU quota. Whereas, staying with this example, decreasing the slider (delta<zero) may mean to de-emphasize storage and emphasize processing speed, then the effect may be to de-increase storage and increase the CPU quota. In some embodiments there may be a separate slider or control for many of the computing and performance attributes that make up project resources.

One of ordinary skill in the art will appreciate that sliders and controls may be arranged and configured in many ways to provide operators with a user-interface for controlling the elastic scaling of project resources. Embodiments may range from single controls that effect many elements of the computing process with a single action, to many fine grain controls that may be designed to elastically scale individual computing performance attributes. For example, an embodiment enabling fine grain control may have separate controls to adjust CPU quota, RAM use, disk access, network bandwidth, process priority, and the like. Similarly, on the other end of the spectrum, an embodiment may implement a single high level control in the aggregate that may be arranged to hide and abstract the separate adjustments to CPU quota, RAM use, disk access, network bandwidth, process priority, and the like. In the case of high-level controls the operator may not be required to have knowledge that a single change in the high level control may affect many of the project's resource components.

Next, process 1200 may return control to a calling process.

Figure 13:
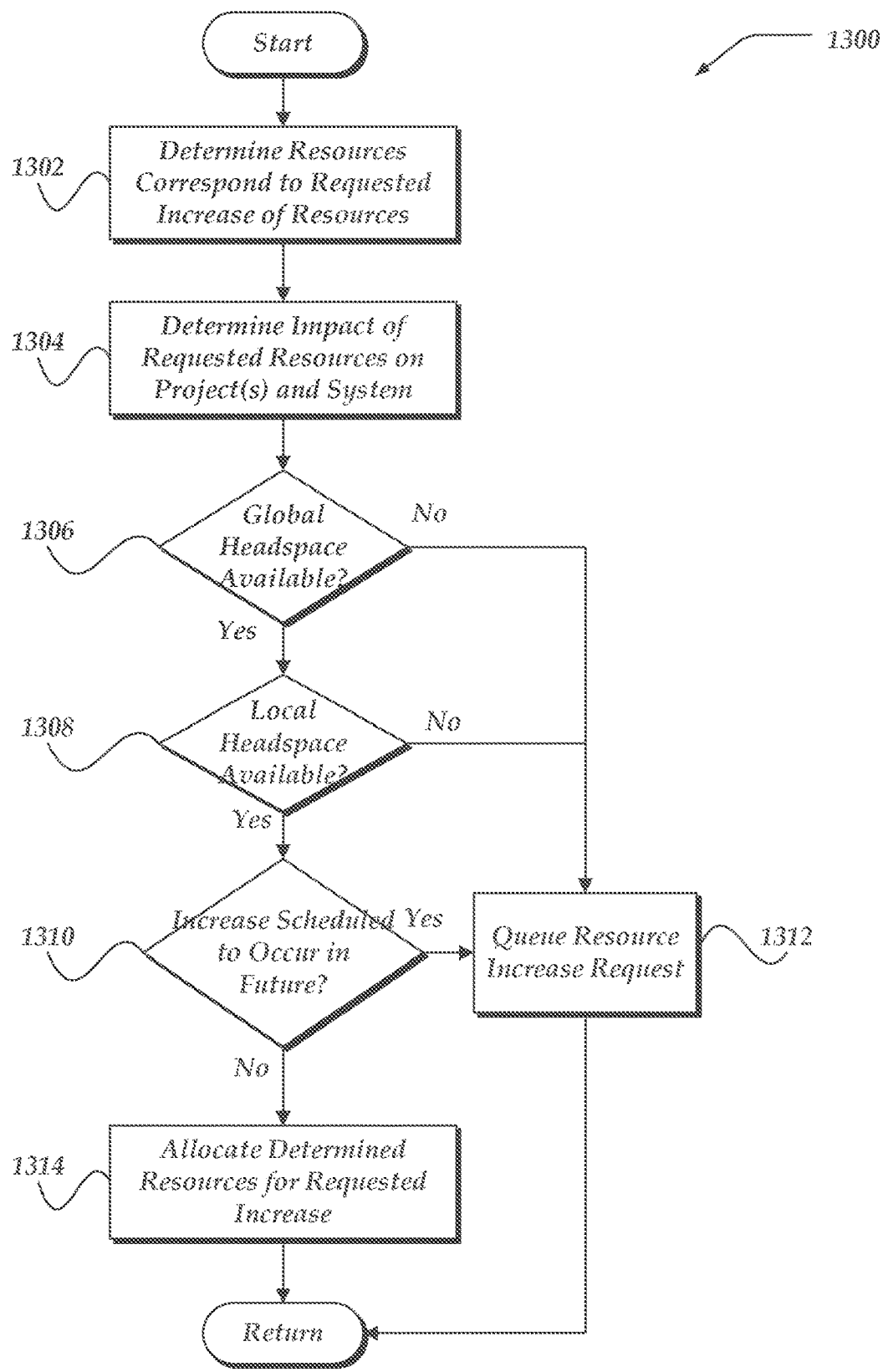
FIG. 13 illustrates a logical flow diagram generally showing one embodiment of a process for increasing a project's resources as part of elastic scaling.

FIG. 13 illustrates a logical flow diagram generally showing one embodiment of a process for increasing a project's resources as part of elastic scaling. In some embodiments, process 1300 of FIG. 13 may be implemented by and/or executed on a single network device, such as network device 400 of FIG. 4. In other embodiments, process 1300 or portions of process 1300 of FIG. 13 may be implemented by and/or executed on a plurality of network devices, such as network device 400 of FIG. 4. In yet other embodiments, process 1300 or portions of process 1300 of FIG. 13 may be implemented by and/or executed on one or more blade servers, such as blade server 250 of FIG. 2B.

Process 1300 begins, after a start block, at block 1302, where particular computing resources that correspond to the requested increase in resources may be determined. As discussed above a requested increase of resources may be a simple request to increase a single component of the computing system, such as CPU quota, or it may represent an increase in an elastic scaling dimension that may require the adjustment and reallocation of more than one component in the computing system, such as, CPU quota, RAM quota, network bandwidth quota, and the like. In some embodiments, an increase of one resource may result in a decrease of another resource.

Process 1300 next proceeds to block 1304, where the impact that the requested resources may have on the project, other projects, and/or the system in general may be determined. In some embodiments, the impact of the requested resources may be static or dynamic. In at least one embodiment, the impact may be automatically determined by rule-based systems, predictive computing techniques, or the like. In another embodiment, the impact may be manually determined by an operator.

Embodiments may be arranged to define rules and thresholds that may set limits on the resources that may be allocated to individual projects. Also, rules may be arranged to determine minimum resources that may be made available for other projects in the system. One of ordinary skill in the art will appreciate that there may be many factors that may be available for analysis when determining if the requested increase of resources may cause unacceptable impact on the project, projects, and/or the system in general. For example, a request to increase index storage size to a very large size may cause such a large data set to be created that the project may not have CPU quota, or RAM quota to effectively process the large dataset. How a condition like this is handled depends on how the embodiment is arranged and configured. In some cases, such an increase in project resources may be aborted because it is out of bounds. In other cases, referring to the example above, an embodiment may determine the necessary CPU quota and RAM quota that may be necessary to keep up with the projected increased index storage size.

After the necessary resources for the requested increase of resources has been determined process 1300 continues at decision block 1306, where a determination may be made whether there is global headspace available for the requested increase of resources. In at least one embodiment, this determination may be made by testing the amount of global headspace available. This test may take into account all of the resources available and provisioned for the operator or process that is requesting the increase of resources for the project. For example, an embodiment may require users to supply a pre-authorization when requested resources would increase a user's total usage of system resources beyond a certain level. Or, an embodiment may be configured to require an administrative user to authorize any resource increase request that may increase total resource use beyond a configured level. In any event, an embodiment may test whether the global conditions may be able to absorb the requested increase in resources.

In at least one embodiment, if there is insufficient global headspace available, then the requested increase in the resource may not be executed at the time of the request. In some embodiments, if the global headspace for the requested increase of resources is available, then process 1300 may flow to decision block 1308; otherwise, process 1300 may flow to block 1312. In some other embodiments, if the increase in resources would exceed global thresholds and/or limitations, then the request for the increase of resources may be discarded.

Process 1300 continues at decision block 1308, where a determination may be made whether the local resources related to the project may be capable of handling the requested increase in project resources. For example, in an embodiment that may be employing virtual machines, the requested increase in project resources may require that a virtual machine allocate more virtual disk space, or it may require that the virtual machine be migrated to another physical machine that may be able to accommodate the requested increase in project resources. In some embodiments, if such operations are unable to be resolved immediately (e.g., within a predefined time period), then the local resources may not be capable of handling the requested increase of project resources. If the local resources are capable of handling the requested increase in project resources, then process 1300 may flow to decision block 1310; otherwise, process 1300 may flow to block 1312 to queue the request.

At decision block 1310, a determination may be made whether the requested increase in project resources may be arranged or configured to occur at a scheduled time in the future. In some embodiments, a user and/or operator may determine a scheduled time when the requested increase may occur. In other embodiments, the scheduled time may be predetermined, such as five minutes from when the request was received. In other embodiments, the scheduled time may be based on the resources requested. For example, if additional CPU quota is requested, then the scheduled time may be one minute from when the request was received, where a request for additional storage space may be scheduled 10 minutes from when the request was received. If the increase may be scheduled to occur in the future, then process 1300 may flow to block 1312 to queue the request; otherwise, process 1300 may flow to block 1314.

At block 1312, the request for the increase of resources may be submitted to a queue. In at least one embodiment, the request may remain in the queue until conditions allow it to be fulfilled (i.e., available resources). One embodiment of queuing project resource requests is described in more detail below in conjunction with FIG. 15. In some embodiments, a process or operator requesting an increase in project resources may not have knowledge of the global resource allocation. Queuing the requested increase in project resources may enable short running processes to finish and expire so that their released resources may be made available to a queued request for increasing project resources. After block 1312, process 1300 may return control to a calling process.

If the requested increase in project resources is not queued, then process 1300 may flow to block 1314. At block 1314, the determined resources for the requested increase may be allocated. Embodiments for allocating resources are discussed in more detail below in conjunction with FIGS. 16-18.

After block 1314, process 1300 may return control to a calling process.

Figure 14:
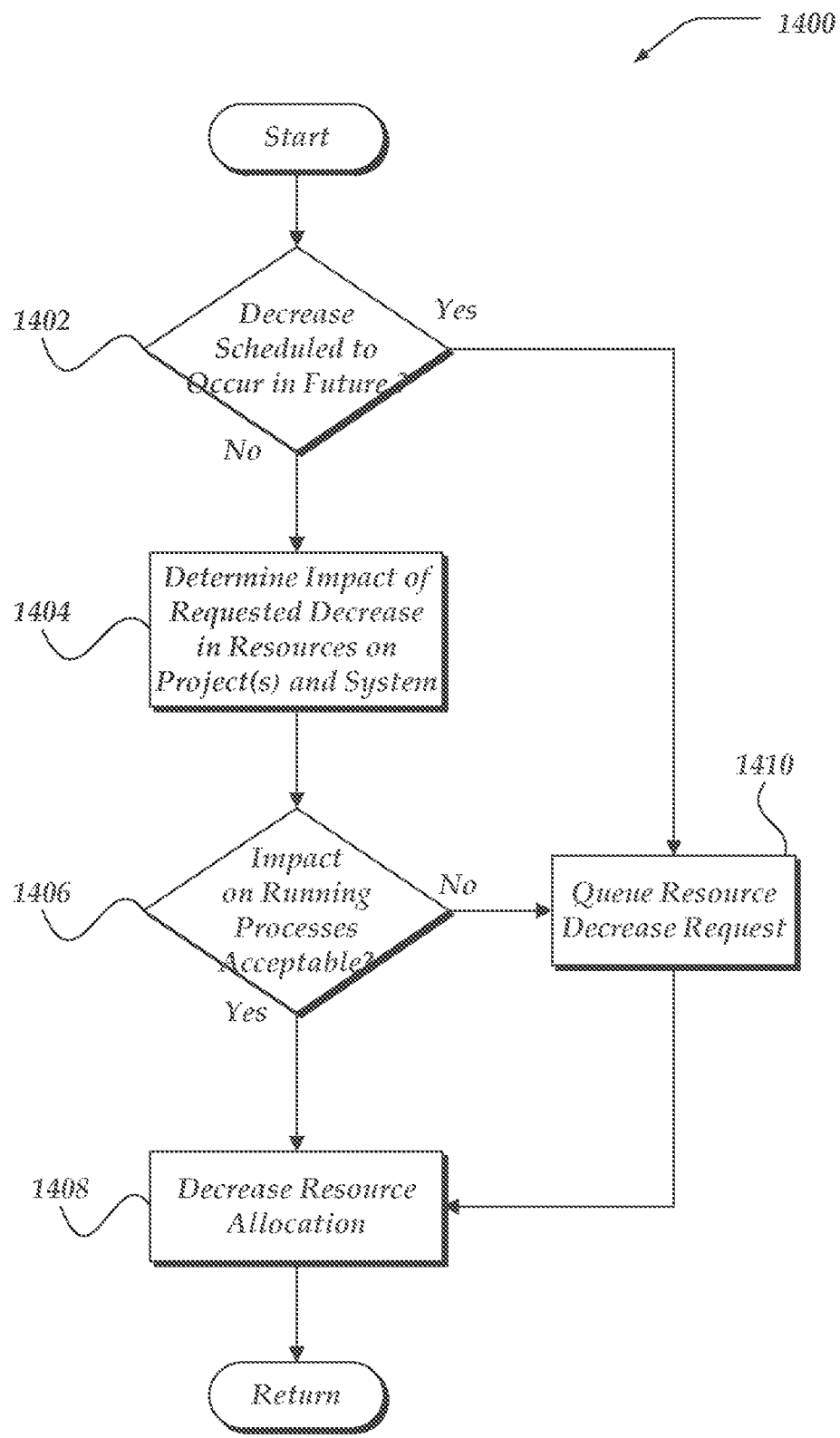
FIG. 14 depicts a logical flow diagram generally showing one embodiment of a process for responding to a requested decrease in project resources.

FIG. 14 depicts a logical flow diagram generally showing one embodiment of process for responding to a requested decrease in project resources. In some embodiments, process 1400 of FIG. 14 may be implemented by and/or executed on a single network device, such as network device 400 of FIG. 4. In other embodiments, process 1400 or portions of process 1400 of FIG. 14 may be implemented by and/or executed on a plurality of network devices, such as network device 400 of FIG. 4. In yet other embodiments, process 1400 or portions of process 1400 of FIG. 14 may be implemented by and/or executed on one or more blade servers, such as blade server 250 of FIG. 2B.

In some embodiments, a requested decrease in project resources may require some system or computing resources to decrease while others may be required to be increased depending on how the relevant control dimension has been arranged and configured.

Process 1400 begins, after a start block, at decision block 1402, where a determination may be made whether the requested decrease in project resources may be scheduled to occur in the future. In at least one embodiment, decision block 1402 may employ embodiments of decision block 1310 of FIG. 13 to determine if a request may be scheduled to occur at a time after the request is received. If the decrease in project resources may be scheduled in the future, then process 1400 may flow to block 1410 to queue the request at least until the scheduled time; otherwise, process 1400 may flow to block 1404.

At block 1404, the impact of the request on the project, other projects, and/or the system as a whole may be determined. In at least one embodiment, block 1404 may employ embodiments of block 1304 of FIG. 13 to determine an impact of resources on the project and the system (noting that block 1304 of FIG. 13 determines based on an increase in resources and block 1404 determines based on a decrease in resources).

Process 1400 next proceeds to decision block 1406, where a determination may be made whether the impact of the requested decrease in project resources is unacceptable. In at least one embodiment, running processes of the current project may be analyzed to determine if they can run to completion under the conditions of the decreased resources. In one non-limiting, non-exhaustive example, a current project may not run to completion if the decrease in resources starves the project of processor time, which may be determined to be unacceptable. If the requested decrease in project resources is acceptable, then process 1400 may flow to block 1408; otherwise, process 1400 may flow to block 1410 to queue the request, which may enable the current processes to finish gracefully. But, in some embodiments a requested decrease in project resource may be arranged and configured so it may not cooperate with the running processes. In such cases, an embodiment may terminate the running process to avoid unpredictable outcomes that may occur if the processes try to continue to run reduced resource environment.

Figure 15:
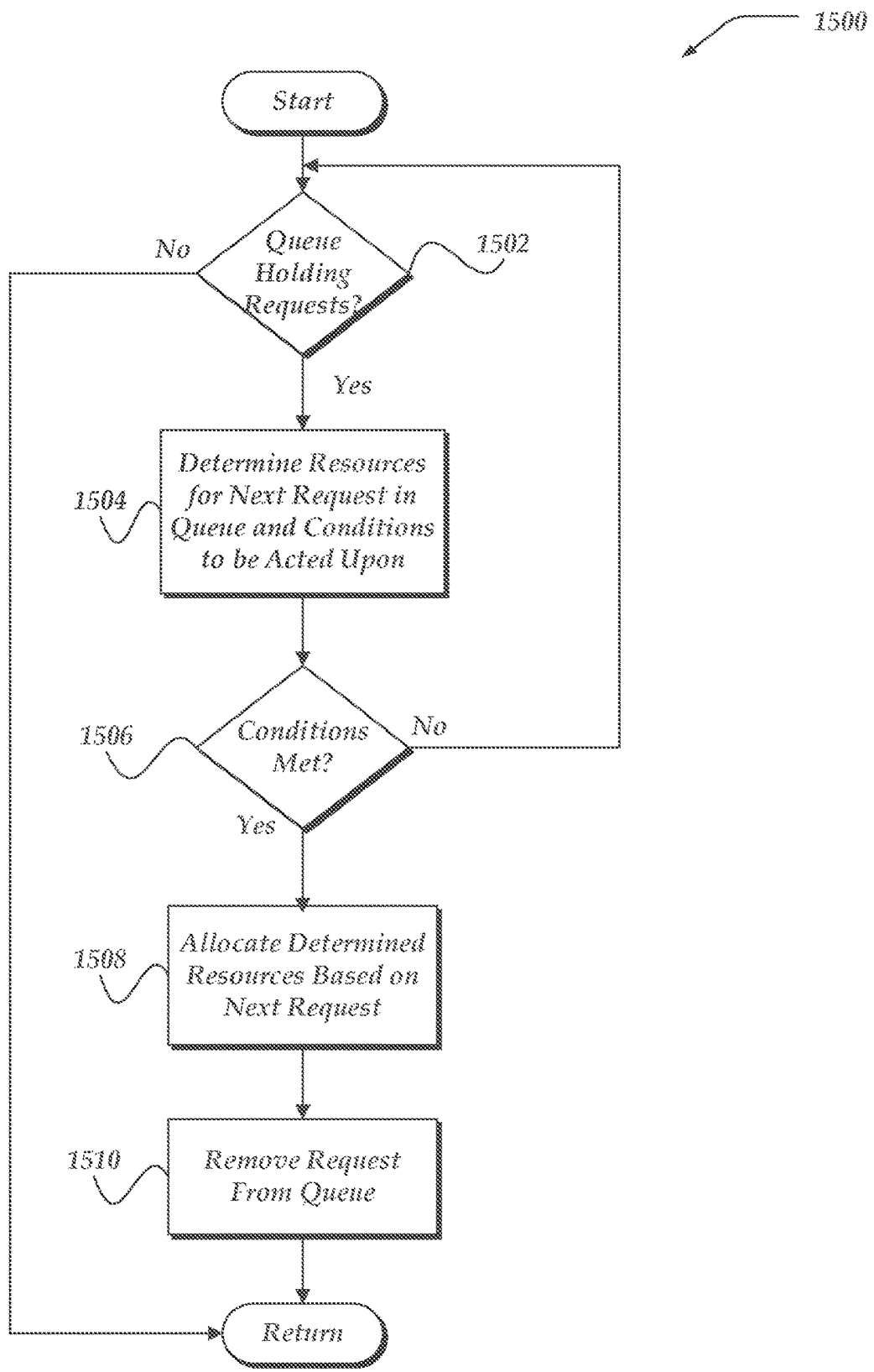
FIG. 15 illustrates a logical flow diagram generally showing one embodiment of process for queuing resource requests.

At block 1410, the resource decrease request may be queued. An embodiment of a project resource request queue is shown in FIG. 15. As discussed above project resource requests may be submitted to a request queue if the request may not be completed at the time it may be initiated. This may occur for many reasons, including lack of local or global resources, lack of authorizations that may be needed, the request may be deliberately schedule to occur in the future, currently running processes may be blocking the request, and the like.

A project resource request queue may be arranged to hold request records that may comprise a data structure that carries the metadata that may contain the information about the resources that may have been determined necessary to execute the request. Such metadata may include instructions on how to allocate resources for all of the components impacted by the resource request. For example, a project resource request may require a CPU quota adjustment and index storage size allocation as part of a single project resource request. In a case like this, a queued resource request may contain metadata and instructions that may be used to executed the CPU quota change and the index storage allocation. In other embodiments the queued request may contain the control delta information from the component that initiated the project request and the underlying components and instructions needed to execute the request may be determined at the time of allocation.

If, at decision block 1406, the requested decrease in project resources is acceptable, then process 1400 may flow from decision block 1406 to block 1408. At block 1408, resource allocation for the current project may be decreased. Embodiments for allocating resources are discussed in more detail below in conjunction with FIGS. 16-18.

After block 1408, process 1400 may return control to a calling process.

FIG. 15 illustrates a logical flow diagram generally showing one embodiment of process for queuing resource requests. In some embodiments, process 1500 of FIG. 15 may be implemented by and/or executed on a single network device, such as network device 400 of FIG. 4. In other embodiments, process 1500 or portions of process 1500 of FIG. 15 may be implemented by and/or executed on a plurality of network devices, such as network device 400 of FIG. 4. In yet other embodiments, process 1500 or portions of process 1500 of FIG. 15 may be implemented by and/or executed on one or more blade servers, such as blade server 250 of FIG. 2B.

Process 1500 begins, after a start block, at decision block 1502, where a determination may be made whether there are queued requests. In at least one embodiment, this determination may be based on whether the queue is holding any requests. If the queue is holding requests, then process 1500 may flow to block 1504; otherwise, process 1500 may return control to a calling process.

At block 1504, a next request in the queue may be examined. In at least one embodiment, this request examination may include a determination of the resources associated with the next request and a determination of the conditions that need to be met for the next request to be acted upon (e.g., acceptable resources available to accommodate the request). In some embodiments, the conditions may include the conditions that led to the next request being entered into the request queue in the first place. For example, the condition may include a scheduled time.

Process 1500 next proceeds to decision block 1506, where a determination may be made whether the conditions to execute the next request are satisfied for the next request. For example, a next request that required prior authorization before proceeding may be tested to see if sufficient authorization has been obtained. Or, global resource conditions may be examined to determine if a next request that may have been queued because of a lack of available global resources now may have sufficient resources available to proceed. For next requests that may have been queued so they may occur at a scheduled time in the future the time may be checked. If the conditions for the next request are met, then process 1500 may flow to block 1508; otherwise, process 1500 may loop to decision block 1502. If conditions for the next request are not met, the process may leave the request in the queue and may examine the next request in the queue. In some embodiments a queue may be configured such that if a request remains in the queue longer that a specified time an additional action may be taken. Such actions may include, notifying the operator, generating alerts in the form of log messages or other notifications, removing the request from the queue, and the like.

At block 1508, the determined resources based on the next request may be allocated. Embodiments for allocating resources are discussed in more detail below in conjunction with FIGS. 16-18.

Process 1500 continues at block 1510, where the completed request may be removed from the queue. In some embodiments, the next request may be configured to be returned to the queue after it has executed. Some requests may be scheduled to occur at a certain time each day. These requests may be returned to the queue to wait until the next time to execute. Other requests may be considered "standing" requests that may remain in the queue waiting for certain conditions to be met. For example, an embodiment may be arranged to automatically increase index storage as it is needed. In this kind of case, an embodiment may use a queued request that may execute when it determines that more index storage is needed.

Embodiments may be arranged to have multiple project resource request queues designated for different types of requests. Also, embodiments may employ general purpose queues that may be used for queue project resource requests as well as other types of requests and events.

After block 1510, process 1500 may return control to a calling process.

Figure 16:
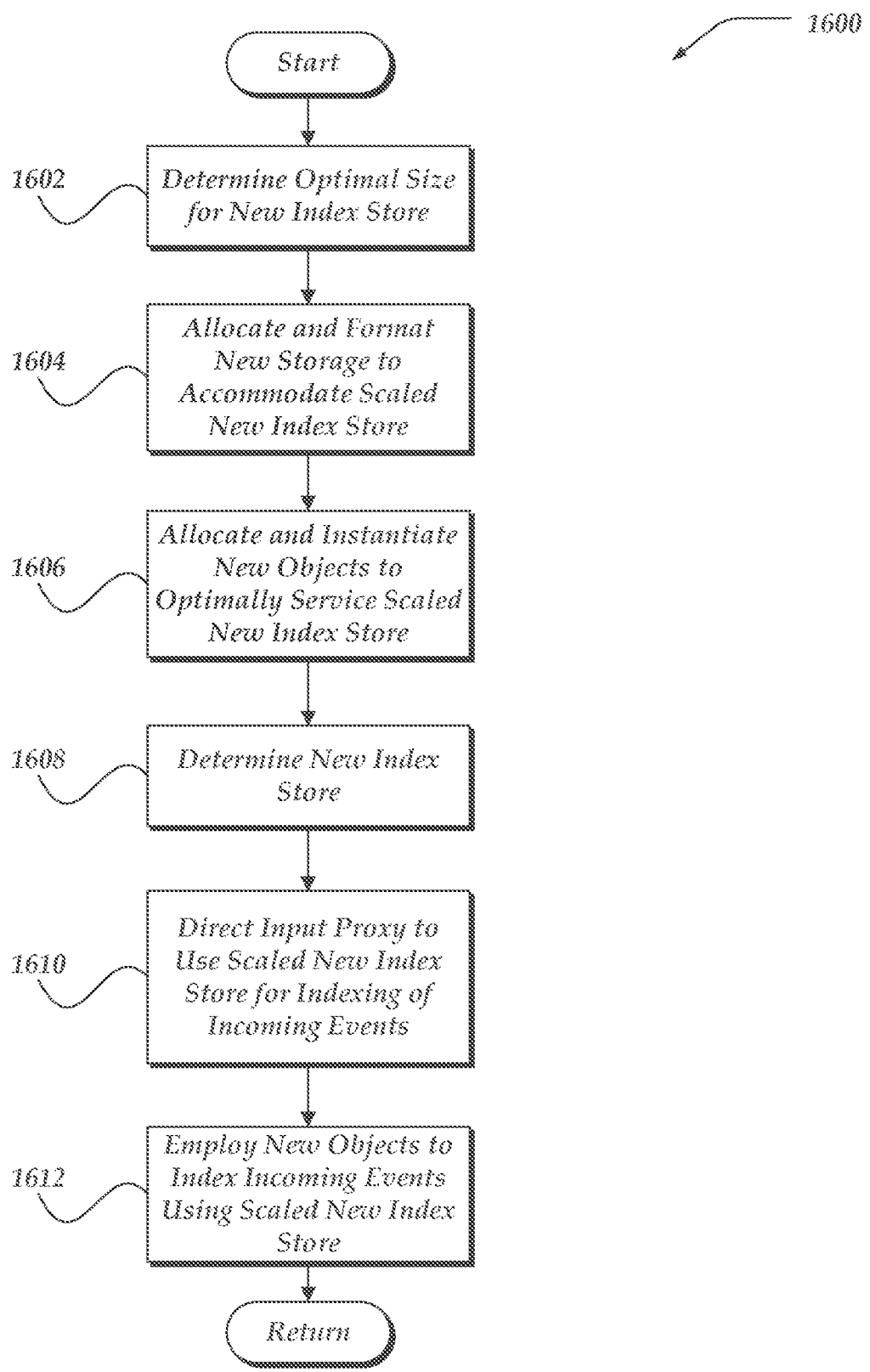
FIG. 16 depicts a logical flow diagram generally showing one embodiment of process for elastically scaling based on index storage size.

As discussed briefly above, embodiments may be arranged to support elastic scaling in one or more dimensions. FIG. 16 depicts a logical flow diagram generally showing one embodiment of process for elastically scaling based on index storage size. In some embodiments, process 1600 of FIG. 16 may be implemented by and/or executed on a single network device, such as network device 400 of FIG. 4. In other embodiments, process 1600 or portions of process 1600 of FIG. 16 may be implemented by and/or executed on a plurality of network devices, such as network device 400 of FIG. 4. In yet other embodiments, process 1600 or portions of process 1600 of FIG. 16 may be implemented by and/or executed on one or more blade servers, such as blade server 250 of FIG. 2B

Process 1600 begins, after a start block, at block 1602, where an optimal storage size for a new index store may be determined. In some embodiments, optimal storage size may be static or dynamic. In at least one embodiment, optimal storage size may be automatically determined by rule-based systems, predictive computing techniques, or the like. In another embodiment, optimal storage size may be manually determined by an operator.

The optimal size may be determined by a rule-based system tailored to the specific project that owns the index store. An embodiment of a rule-based system for elastic scaling may employ triggers linked to performance and resource thresholds. Different projects may be configured to have different triggers and different thresholds depending on the requirements of the project. In addition to rule-based determination, the optimal size for index store may be determined by an operator using a user-interface control such as a slider, dial, radio buttons, and the like. Even though an operator has used a control to determine the optimal size, an embodiment may translate the operation of the control into the actual optimal index store size. For example, an operator may use a user interface to control to increase an index store from 5 gigabytes to 10 gigabytes. In this case an embodiment may have to make several determinations to account for the actual storage size needed to account for administration overhead that may not be apparent to the operator.

Process 1600 continues at block 1604, where new storage may be allocated and/or formatted to accommodate the elastic scaling of the index store. New storage may be created so the current index store may not be altered or disturbed during the elastic scaling process.

Process 1600 proceeds next to block 1606, where new objects and/or processes may be allocated and/or instantiated to optimally service the scaled new index store. Embodiments may create new objects and processes to avoid disturbing the current index store during the elastic scaling process.

Continuing at block 1608, the new index store may be determined. At least one embodiment for determining a new index store is described in more detail below in conjunction with FIG. 19. Briefly, however, in some embodiments indexers may be activated (i.e., marked as read/write) or deactivated (i.e., marked as read-only based on a number of indexers needed for the scaled new index store storage. In some other embodiments, the current index store may be marked as read-only and the new index store may be generated from new indexers. This may ensure that the all new writes to the index store may be written into the scaled new index store storage.

Figure 22:
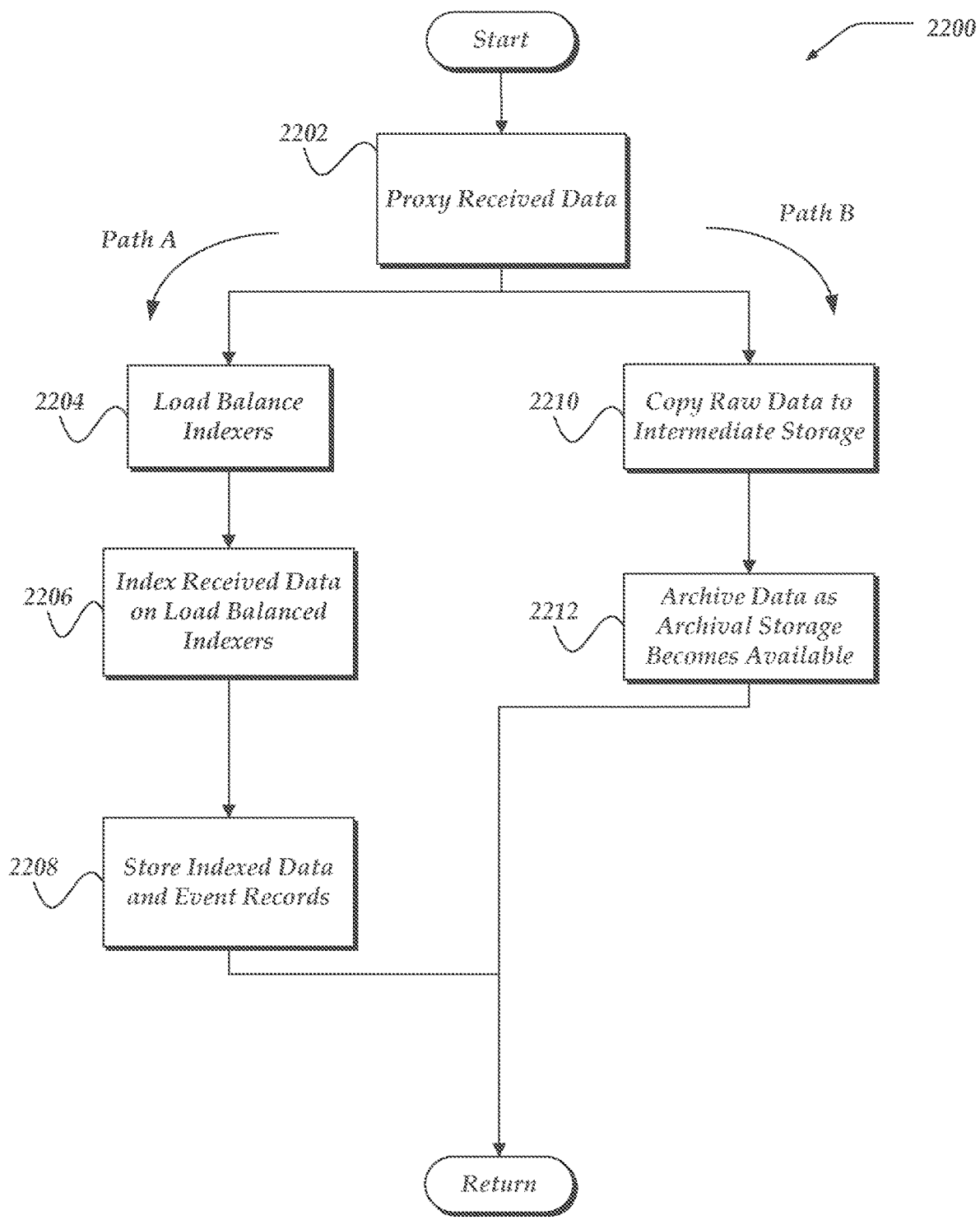
FIG. 22 illustrates a logical flow diagram generally showing one embodiment of an input proxy operation.

Process 1600 next proceeds to block 1610, which is discussed in more detail below in conjunction with FIG. 22. Briefly, however, at block 1610, an input proxy may be directed to use the scaled new index store for the indexing of incoming events.

Process 1600 continues at block 1612, where the new objects and/or processes may be employed to index incoming events using the scaled new index store. In at least one embodiment, incoming events and/or incoming data may include new events/data and/or archived events/data.

In at least one embodiment, the scaled new index store may be utilized based on Roles of the new indexes. In some embodiments, new indexes (which may include the new objects, new processes, or the like) may be automatically added to existing indexes (which may include the existing objects, existing processes, or the like). In at least one embodiment, the new indexes may be attached to and/or inherit Roles associated with the existing indexes for at least one Core User of the project. In such an embodiment, the input proxy may utilize the inherited Roles during a scaling event to determine when to send incoming events (and/or other data) to the new indexes. As described above, the Roles may determine access controls to the indexes.

After block 1612, process 1600 may return control to a calling process.

Figure 17:
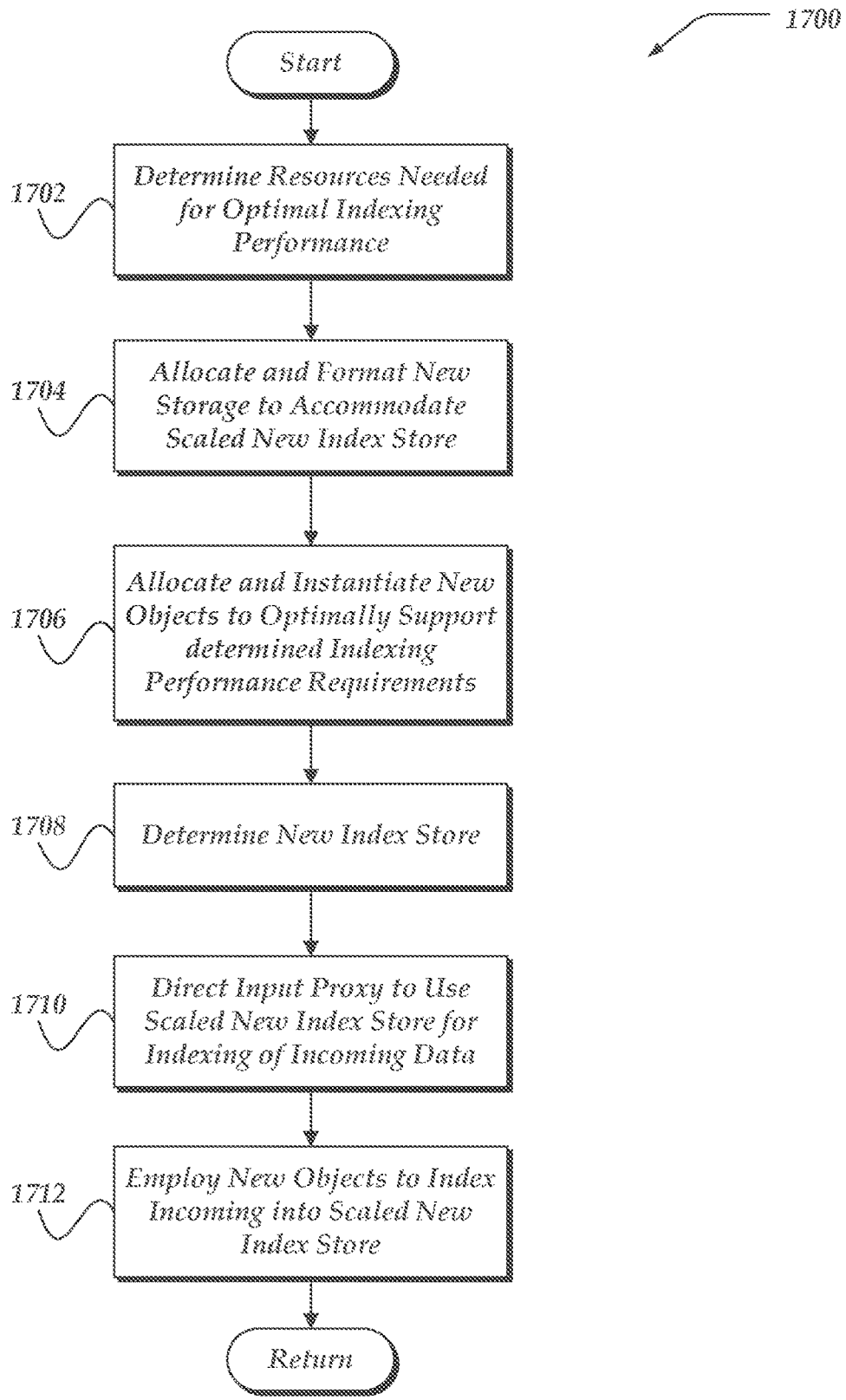
FIG. 17 depicts a logical flow diagram generally showing one embodiment of a process for elastically scaling based on indexing performance.

FIG. 17 depicts a logical flow diagram generally showing one embodiment of a process for elastically scaling based on indexing performance. In some embodiments, process 1700 of FIG. 17 may be implemented by and/or executed on a single network device, such as network device 400 of FIG. 4. In other embodiments, process 1700 or portions of process 1700 of FIG. 17 may be implemented by and/or executed on a plurality of network devices, such as network device 400 of FIG. 4. In yet other embodiments, process 1700 or portions of process 1700 of FIG. 17 may be implemented by and/or executed on one or more blade servers, such as blade server 250 of FIG. 2B.

Indexing performance may be a compound elastic scaling dimension that may be generally related to speed of the processing for a project. For many embodiments multiple component resources, such CPU quota, network bandwidth quota, RAM quota, index storage, and like, may be scaled to execute elastic scaling based on Indexing Performance.

Process 1700 begins, after a start block, at block 1702, where resources needed for optimal indexing performance may be determined. In at least one embodiment, optimal indexing performance may be automatically determined by rule-based systems, predictive computing techniques, or the like. In another embodiment, optimal indexing performance may be manually determined by an operator.

The specific resources needed may be determined by a rule-based system tailored to a specific project. An embodiment of a rule-based system for elastic scaling may employ triggers linked to performance and resource thresholds. Different projects may be configured to have different triggers and different thresholds depending on the requirements of the project. In addition to rule-based determination the optimal resource allocation may be determined by an operator using a user-interface control such as a slider, dial, radio buttons, and the like. Even though an operator may use a control to determine the optimal indexing performance an embodiment may translate the operation of the control into the actual optimal allocation of resources. For example, an operator may use a user interface to control to increase a projects indexing performance from "low" to "high." However, in this case an embodiment may have to make several determinations to account for CPU quota, disk access quota, RAM quota, storage size, and the like, the details of which may not be apparent to the operator.

Process 1700 proceeds to block 1704, where new storage may be allocated and/or formatted to accommodate the elastic scaling of the indexing performance. An embodiment may allocate and format a new storage even if the size of the data store has not increase or decrease. New storage may be created so the current index store may not be altered or disturbed during the elastic scaling process.

Processing continues at block 1706, where new objects and/or processes may be allocated and/or instantiated to optimally support the determined indexing performance requirements. Embodiments may create new objects and processes to avoid disturbing the current index store during the elastic scaling process.

Process 1700 proceeds next at block 1708, where the new index store may be determined. In at least one embodiment, block 1708 may employ embodiments of block 1608 of FIG. 16 to determine the new index store.

Process 1700 continues next at block 1710, which is discussed in more detail below in conjunction with FIG. 22 Briefly, however, at block 1710, an input proxy may be directed to use the scaled new index store for the indexing of incoming events.

Process 1700 proceeds to block 1712, where the new objects and/or processes may be employed to index incoming events using the scaled new index store. In at least one embodiment, incoming events and/or incoming data may include new events/data and/or archived events/data. In at least one embodiment, block 1712 may employ embodiments of block 1612 of FIG. 16 to use the scaled new index store.

After block 1712, process 1700 may return control to a calling process.

Figure 18:
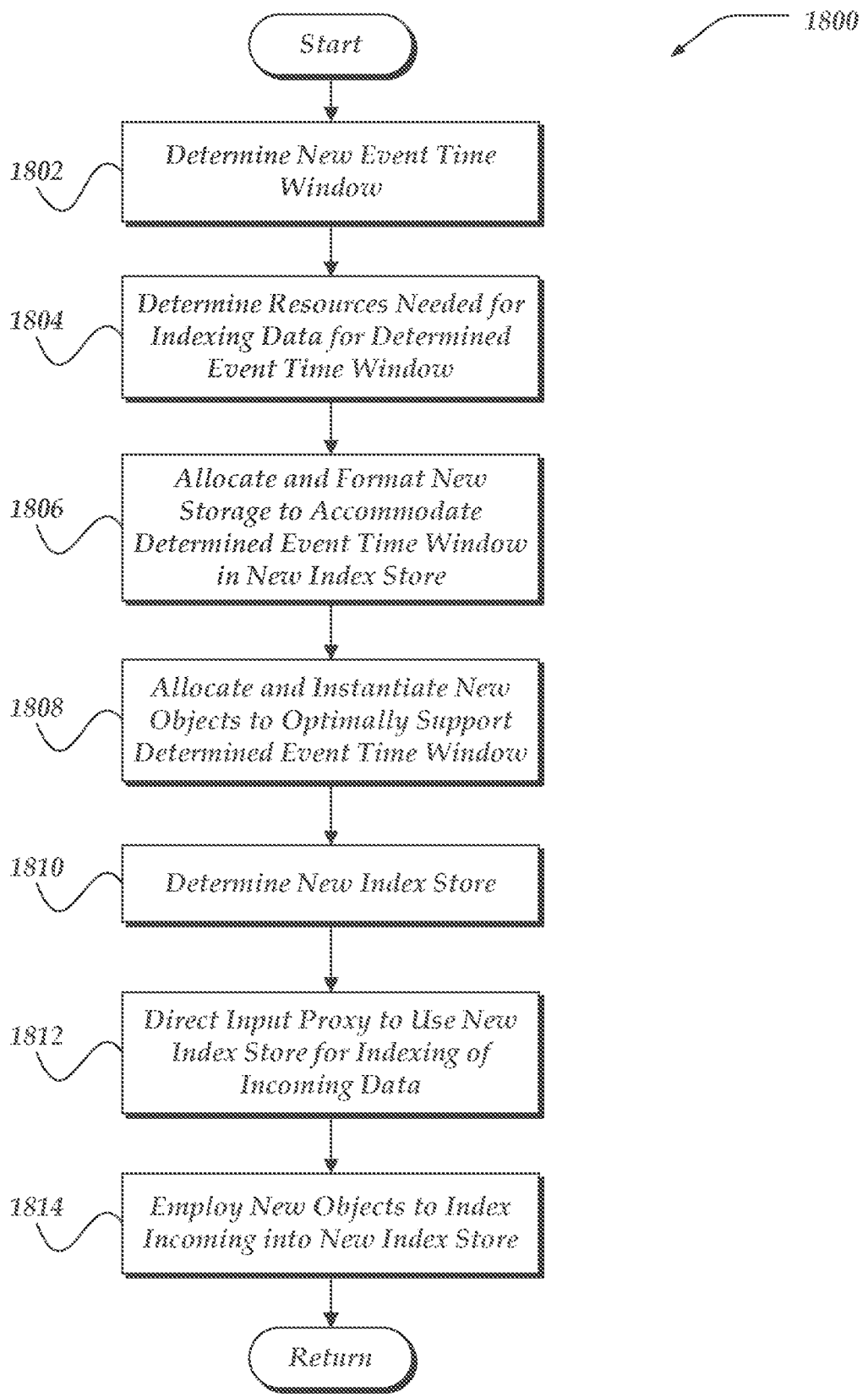
FIG. 18 depicts a logical flow diagram generally showing one embodiment of a process for elastically scaling based on an event time window.

FIG. 18 depicts a logical flow diagram generally showing one embodiment of a process for elastically scaling based on an event time window. In some embodiments, process 1800 of FIG. 18 may be implemented by and/or executed on a single network device, such as network device 400 of FIG. 4. In other embodiments, process 1800 or portions of process 1800 of FIG. 18 may be implemented by and/or executed on a plurality of network devices, such as network device 400 of FIG. 4. In yet other embodiments, process 1800 or portions of process 1800 of FIG. 18 may be implemented by and/or executed on one or more blade servers, such as blade server 250 of FIG. 2B.

Event time window may be a compound elastic scaling dimension that may be generally related to the index storage sizes for a project. An embodiment may be arranged to receive data such that the index store may be sufficient to hold data received during a determined time window. A time window may be described as date-time expression such as, a start date-time and an end date-time, a duration, such as 30 days, start date-time plus a duration, and the like. For many embodiments multiple component resources, such CPU quota, network bandwidth quota, RAM quota, index storage, and like, may be scaled to execute elastic scaling based on event time windows.

Process 1800 begins, after a start block, at block 1802, where a new event time window may be determined. The event time window may be submitted as a complete time duration expression or it may be dynamically determined based on past event traffic and predicted future event traffic or any method to describe a time window for capturing events.

Process 1800 proceeds next to block 1804, where resources needed for indexing data for the determined event time window may be determined. The specific resources needed may be determined by a rule-based system tailored for specific projects. An embodiment of a rule-based system for elastic scaling may employ triggers linked to performance and resource thresholds. Different projects may be configured to have different triggers and different thresholds depending on the requirements of the project. In addition to rule-based determination, the optimal resource allocation may be determined by an operator using a user-interface control such as a slider, dial, radio buttons, and the like. Even though an operator may use a control to determine the optimal indexing performance an embodiment may translate the operation of the control into the actual optimal allocation of resources. For example, an operator may use a user interface control to increase a project's event time window from "10 days" to "30 days." However, in this case an embodiment may have to make several determinations to account for CPU quota, disk access quota, RAM quota, storage size, and the like, the details of which may not be apparent to the operator.

In any event, process 1800 continues at block 1806, where new storage may be allocated and/or formatted to accommodate the elastic scaling of the determined event time window in the new index store. New storage may be created so the current index store may not be altered or disturbed during the elastic scaling process.

Process 1800 proceeds to block 1808, where new objects and/or processes may be allocated and/or instantiated to optimally support the determined event time window. Embodiments may create new objects and processes to avoid disturbing the current index store during the elastic scaling process.

Continuing to block 1810, the new index store may be determined. In at least one embodiment, block 1708 may employ embodiments of block 1608 of FIG. 16 to determine the new index store.

Process 1800 proceeds next to block 1812, which is discussed in more detail below in conjunction with FIG. 22. Briefly, however, at block 1812, an input proxy may be directed to use the scaled new index store for the indexing of incoming data.

Process 1800 continues to block 1814, where the new objects and/or processes may be employed for indexing incoming data using the scaled new index store. In at least one embodiment, incoming events and/or incoming data may include new events/data and/or archived events/data. In at least one embodiment, block 1814 may employ embodiments of block 1612 of FIG. 16 to use the scaled new index store.

After block 1814, process 1800 may return control to a calling process.

Figure 19:
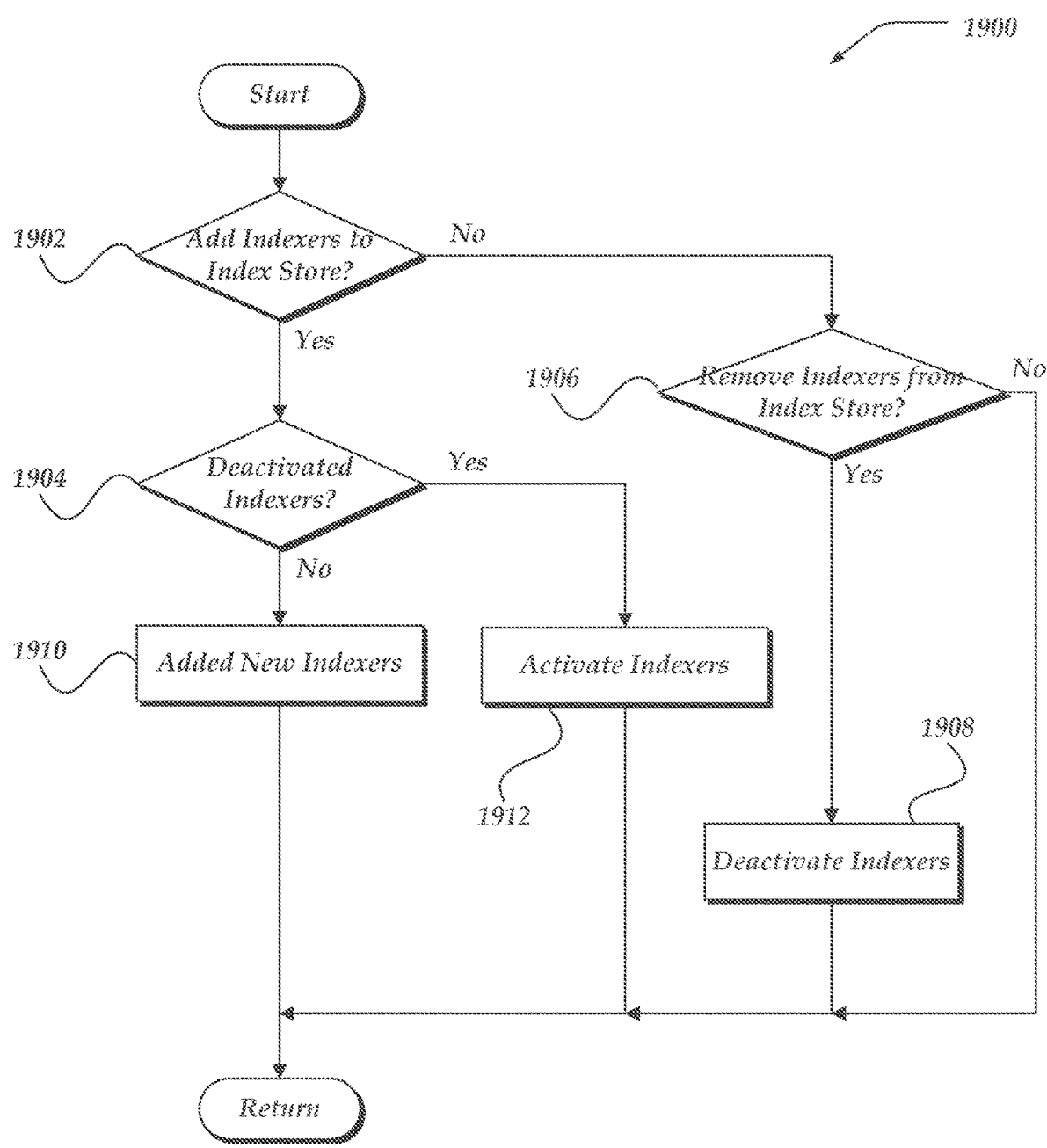
FIG. 19 illustrates a logical flow diagram generally showing one embodiment of a process for changing a number of indexers associated with an index store

FIG. 19, illustrates a logical flow diagram generally showing one embodiment of a process for changing a number of indexers associated with an index store. In some embodiments, process 1900 of FIG. 19 may be implemented by and/or executed on a single network device, such as network device 400 of FIG. 4. In other embodiments, process 1900 or portions of process 1900 of FIG. 19 may be implemented by and/or executed on a plurality of network devices, such as network device 400 of FIG. 4. In yet other embodiments, process 1900 or portions of process 1900 of FIG. 19 may be implemented by and/or executed on one or more blade servers, such as blade server 250 of FIG. 2B.

Although process 1900 describes changing a number of indexers, in some embodiments, changing a number of indexers (e.g., indexer servers) may also include changing an amount of resources associated with a project, such as, for example, storage, objects, processors, or the like. In at least one embodiment, adding additional indexers may include adding additional storage space and/or processors (and/or other resources). In another embodiment, reducing a number of indexers may include reducing storage space and/or processors (and/or other resources. In yet other embodiments, resources for a given indexer server may also be changed. In some embodiments, resources of an indexer server may be changed by changing a number of indexes used by a project, which may also change an amount of storage, processing capacity, or the like for the project.

Process 1900 begins, after a start block, at decision block 1902, where a determination may be made whether additional indexers may be added to the index store. In at least one embodiment, the determination may be based on the elastic scaling. In some embodiments, if the storage size and/or the performance are increased, then indexers may be added to the index store. If indexers may be added to the index store, then process 1900 may flow to decision block 1904; otherwise, process 1900 may flow to decision block 1906.

At decision block 1906, a determination may be made whether to remove indexers from the index store. In at least one embodiment, the determination may be based on the elastic scaling. In some embodiments, if the storage size and/or the performance are decreased, then indexers may be removed from the index store. If indexers may be removed from the index store, then process 1900 may flow to block 1908; otherwise, process 1900 may return control to a calling process.

At block 1908, at least one indexer may be deactivated. In some embodiments, de-activating an indexer may include marking the indexer as read-only. In at least one embodiment, a read-only indexer may indicate that the indexer is not currently active for the new index store. In some embodiments, a determination may be made on which indexers to deactivate based on time (e.g., creation time, last modified time, last access time, or the like), size of the indexer, or the like. In at least one embodiment, a user may be prevented from accessing a deactivated indexer. In some embodiments, if the indexer is deactivated for a period of time, then the data may be removed from the deactivated indexer (e.g., deleted and/or moved to archival storage).

If, at decision block 1902, additional indexers may be added to the index store, then processing may flow from decision block 1902 to decision block 1904. At decision block 1904, a determination may be made whether there are deactivated indexers (such as were deactivated at block 1908). If there are deactivated indexers, then process 1900 may flow to block 1912; otherwise, process 1900 may flow to block 1910.

At block 1912, at least one currently deactivated indexer may be activated and added to the new index store. In at least one embodiment, activating may include marking a read-only indexer as a read/write indexer. After block 1912, process 1900 may return control to a calling process.

If, at decision block 1904, there are no deactivated indexers, then process 1900 may flow from decision block 1904 to block 1910. At block 1910, new indexers may be added to the new index store. After block 1910, process 1900 may return control to a calling process.

Figure 20:
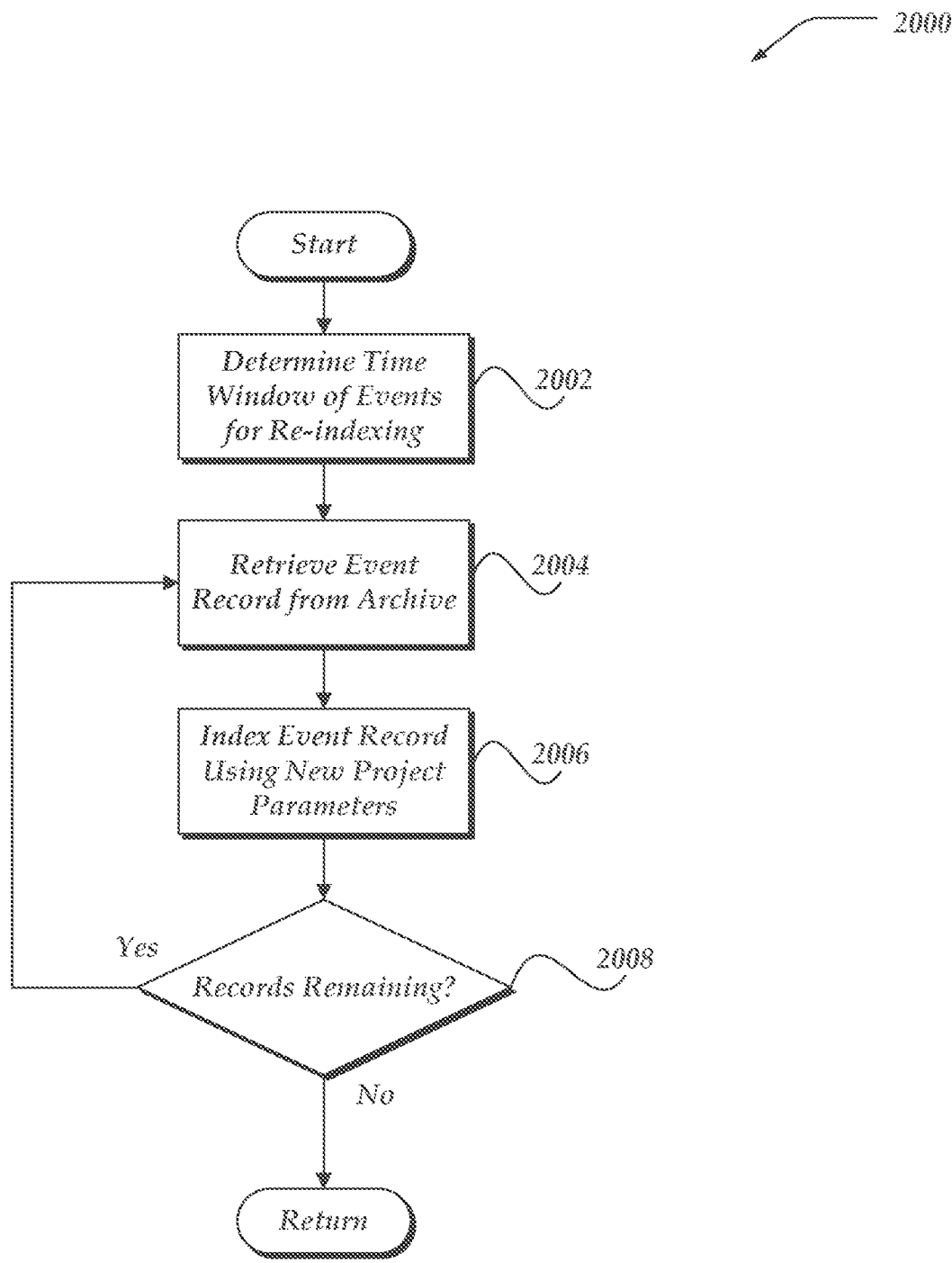
FIG. 20 shows a logical flow diagram generally showing one embodiment of a process to recall archived data for re-indexing.

FIG. 20 shows a logical flow diagram generally showing one embodiment of a process to recall archived data for re-indexing. In some embodiments, process 2000 of FIG. 20 may be implemented by and/or executed on a single network device, such as network device 400 of FIG. 4. In other embodiments, process 2000 or portions of process 2000 of FIG. 20 may be implemented by and/or executed on a plurality of network devices, such as network device 400 of FIG. 4. In yet other embodiments, process 2000 or portions of process 2000 of FIG. 20 may be implemented by and/or executed on one or more blade servers, such as blade server 250 of FIG. 2B.

Embodiments may be arranged to archive input data as it is indexed. (See, input proxy, as shown in FIG. 22, for more details about archiving.) Data stored in the archives may be in the same format and form as it was sent to the input proxy. A process may process data from the archive and create indexes from the data. This may enable operators to re-create indexes from the archived data and it may enable operators to create new indexes that may be processed differently from the indexes that may have been created when the data was first received.

Process 2000 begins, after a start block, at block 2002, where a time window of events may be determined for re-indexing. The time windows may be determined be a rule-based algorithm that may automatically determine the time window or an operator may select the time window manually using a user interface.

Process 2000 continues at block 2004, where event data records may be retrieved from the archive.

Process 2000 proceeds next to block 2000, where the retrieved event data records are indexed using the current project's parameters. Recall of archived event data may occur in the context of a new project or it may occur as part of an existing project.

Processing continues at decision block 2008, where a determination may be made whether, there are additional records remaining in the archive. In some embodiments, the process may continue to retrieve records and index them from the archive until all the data within the determined time window has been exhausted. In some embodiments a recall process may be aborted or paused based on operator intervention or when determined performance thresholds have been reached. If there are records remaining in the archive, then process 2000 may loop to block 2004; otherwise, process 2000 may return control to a calling process.

Figure 21:
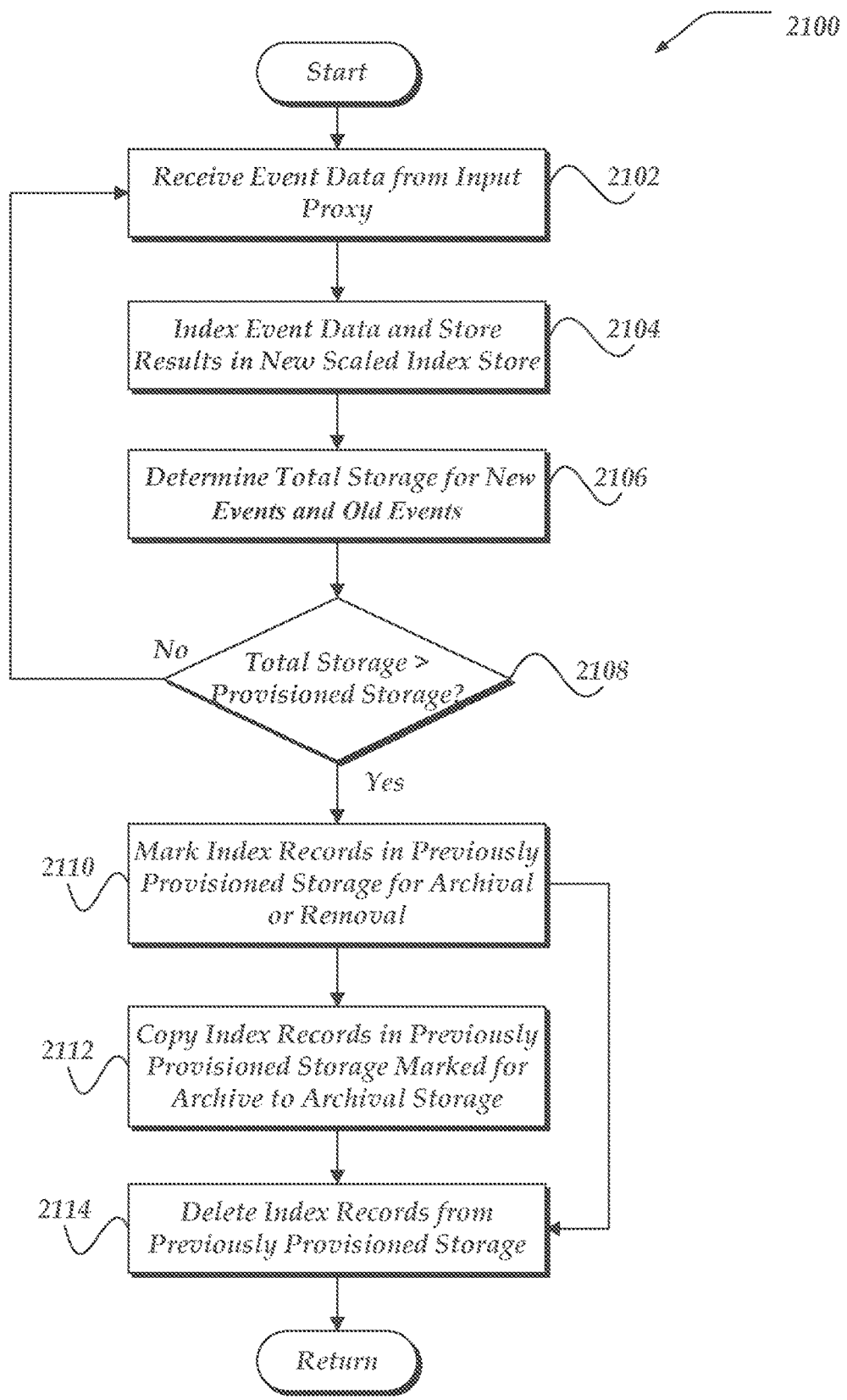
FIG. 21 illustrates a logical flow diagram generally showing one embodiment of a process for transitioning to scaled index stores.

As described above, a new scaled index store may be employed based on elastic scaling. In some embodiments, data from a previous index store may remain available while the new scaled index store is employed. FIG. 21 illustrates a logical flow diagram generally showing one embodiment of a process for transitioning to scaled index stores. In some embodiments, process 2100 of FIG. 21 may be implemented by and/or executed on a single network device, such as network device 400 of FIG. 4. In other embodiments, process 2100 or portions of process 2100 of FIG. 21 may be implemented by and/or executed on a plurality of network devices, such as network device 400 of FIG. 4. In yet other embodiments, process 2100 or portions of process 2100 of FIG. 21 may be implemented by and/or executed on one or more blade servers, such as blade server 250 of FIG. 2B.

Process 2100 begins, after a start block, at block 2102, where event data may be received from an input proxy. Embodiments of employing an input proxy are described in more detail below in conjunction with FIG. 22.

Process 2100 next proceeds to block 2104, where the received event data may be indexed. In at least one embodiment, the indexed event data may be stored in the new scaled index store.

Process 2100 continues at block 2106, where the total storage for the new events stored in the scaled new index store and the old event that may be stored in the previously used read-only index store may be determined. Proceeding to decision block 2108, a determination may be made whether the total amount of storage used is greater than the amount of stated provisioned for the project. If the total storage used is greater than the amount of storage provisioned for the project, then process 2100 may flow to block

2110; otherwise, process 2100 may loop back to block 2102 to receive additional event data from the Input Proxy.

At block 2110, the index records in the previously provisioned storage may be marked for archival or removal. For the index records marked for archival, process 2100 may flow to block 2112; for the index records marked for removal, process 2100 may flow to block 2114.

At block 2110, the index records marked for archival may be copied from the previously provisioned storage to archival storage.

At block 2114, the index records marked for removal may be deleted from the previously provisioned storage. In some embodiments, index records marked from archive may be deleted from the previously provisioned storage after being copied to the archival storage.

After block 2114, process 2100 may return control to a calling process.

As described above, some embodiments may enable the operation of an input proxy. FIG. 22 illustrates a logical flow diagram generally showing one embodiment of an input proxy operation. In some embodiments, process 2200 of FIG. 22 may be implemented by and/or executed on a single network device, such as network device 400 of FIG. 4. In other embodiments, process 2200 or portions of process 2200 of FIG. 22 may be implemented by and/or executed on a plurality of network devices, such as network device 400 of FIG. 4. In yet other embodiments, process 2200 or portions of process 2200 of FIG. 22 may be implemented by and/or executed on one or more blade servers, such as blade server 250 of FIG. 2B.

Process 2200 begins, after a start block, at block 2202 where the proxy may receive data. The data may be received from remote clients and sources. The data source may stream the data to the input proxy using various networking technologies, including, Ethernet, 802.11 (a,b,g, and n), Bluetooth, TCP/IP, UDP, HTTP, internal specific point-to-point protocol, and the like. In some embodiments, the proxy may throttle (increase or decrease) a rate at which data incoming data is streamed. In at least one embodiment, the data rate may be based on a corresponding project. For example, the data rate may be based on an amount of storage space allocated for the project (e.g., an amount of storage space purchased by a user for the project). The data may be received and a process may "tee" the data, sending it down at least two paths at the same time, which may be depicted in FIG. 22 as Path A and Path B.

Proceeding on Path A, process 2200 may proceed from block 2202 to block 2204. At block 2204, the raw data may be load balanced to determine which indexer to use.

Process 2200 continues next at block 2206, where the received data may be indexed on the load balanced indexers. In some embodiments, a size of each indexer may not be limited. In other embodiments, the size of each indexer may be limited. In one such embodiment, an amount of data per indexer may be monitored. In one embodiment, the monitoring may be asynchronous to incoming data. In some embodiment, if a limit for an indexer is reached or almost reached (e.g., less than 5% remaining), then a message may be sent to a user to indicate that the indexer limit is reached or almost reached.

In some other embodiments, indexing may be disabled if a user exceeds purchased resource allocation. In at least one embodiment, indexing may be disabled if a user and/or project exceeds an allocated storage size (e.g., previously purchased amount of storage). In another embodiment, indexing may be disabled if a user discontinues paying for the indexing. In yet another embodiment, indexing may be disabled if a user and/or project exceeds a number of buckets for the project.

Process 2200 next proceeds to block 2208, where the indexed data and event records may be stored in the project's index store.

Proceeding on Path B, process 2200 may proceed from block 2202 to block 2210. At block 2210, the raw data may be sent to be copied to intermediate storage. The intermediate storage may be arranged to be available, fast and reliable. Embodiments may employ a FIFO buffer implemented by local hard disks, RAID arrays, and the like, to ensure that the raw data is not lost.

Process 2200 continues at block 2212, where the data may be archived as archival storage becomes available. Moving the raw data from the intermediate storage to the long term archive may be executed by a separate process that reliably moves the raw data from the intermediate storage to the long term storage. After block 2208 and 2212, process 2200 may return control to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Use Case Illustration

Figure 23:
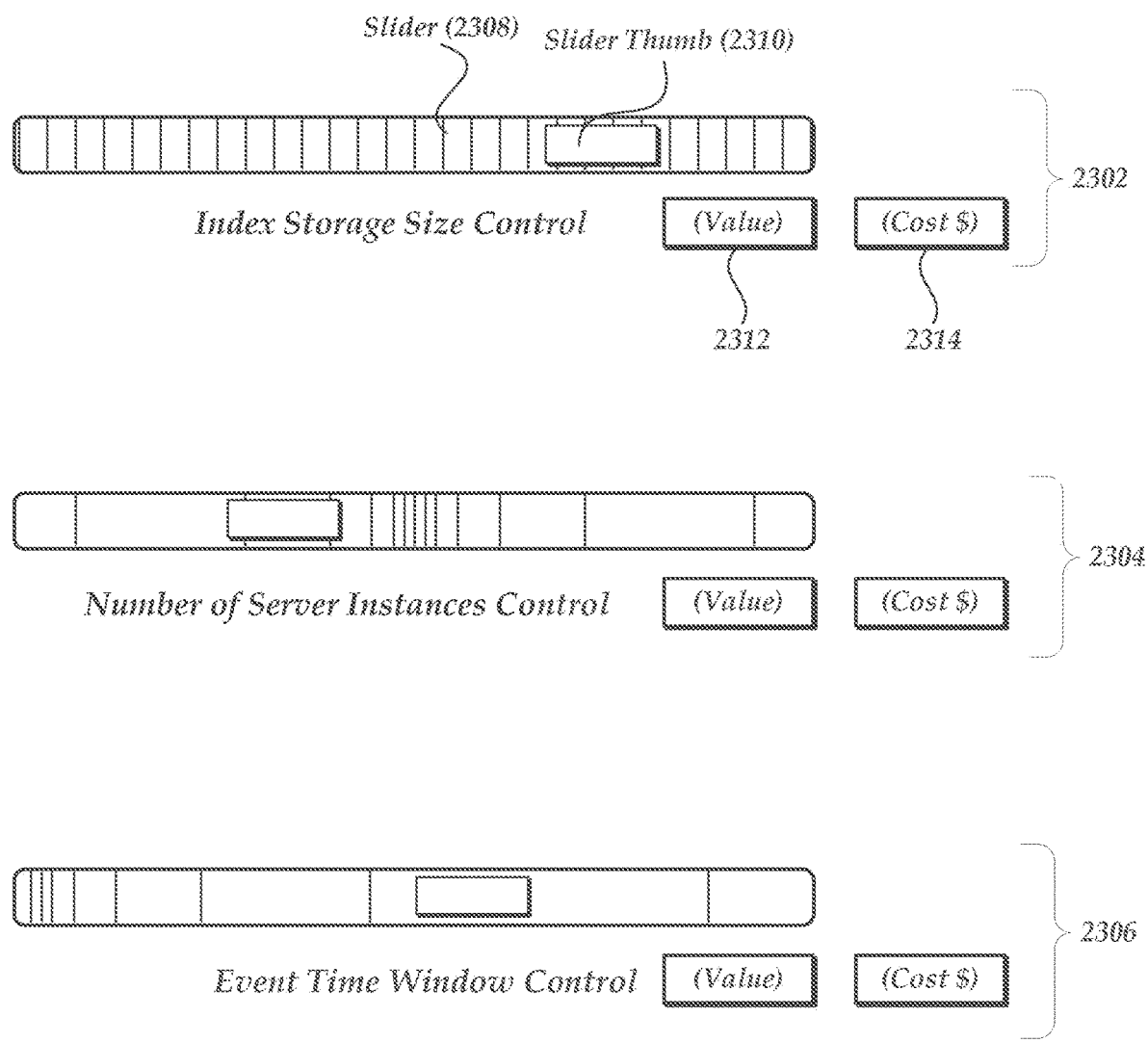
FIG. 23 illustrates a non-exhaustive example of a use case of an embodiment of user-interface controls for managing and processing data volumes.

FIG. 23 illustrates a non-exhaustive example of a use case of an embodiment of user-interface controls that may be employed to enable elastic scaling. As shown in FIG. 23, an embodiment may be arranged to provide user-interface controls, such as sliders, dials, radio buttons, spinners, touch controls, gesture controls, and the like, that may enable an operator to elastically scale resources that may be associated with a project. One exemplary user-interface is shown in the FIG. 23. This may represent a user-interface having three slider controls for controlling the resource for the project.

As shown in FIG. 23, a slider control (e.g., control 2302, control 2304, and/or control 2306) may generally comprise a slider 2308 and a slider thumb 2310. An operator may manipulate the slider thumb 2310 by moving it forward or backwards lengthwise within the slider 2308. The movement of the slider thumb 2310 may generate intermediate values that may be used for determining corresponding to elastic scaling values.

The embodiment depicted in FIG. 23 has three slider controls. Control 2302, on the top of the figure, may be use for the elastic scaling of index storage size. Control, in the center of the figure, may be used for the elastic scaling of the number of server instances the may be used to support a project. And, control 2306, at the bottom of the figure, may be used to set the index storage size by event time window.

Control 2302 may also include text box 2312 and text box 2314. In at least one embodiment, text box 2312 may display the current value represented by the position of slider thumb 2310 in slider 2308. In some other embodiments, text box 2312 may enable a user to enter a desired value, and slider thumb 2310 may automatically slide to the corresponding position in slider 2308.

In another embodiment, text box 2314 may display how much the current value (i.e., what is displayed in text box 2312) of control 2302 will cost the owner of the project. In some other embodiments, text box 2314 may enable a user to enter a desired cost, and slider thumb 2310 may automatically slide to the corresponding position in slider 2308. As shown, each slider control may include text box 2312 and/or text box 2314. However, it should be appreciated that embodiments are not restricted to arranging text boxes as depicted herein. Embodiments may be expected to use a variety of user interface methods to indicate the current value of the controls and well as how much the selected value may cost. Also, embodiments may be arranged to display values different and in addition to those depicted herein, or none at all.

Some embodiments may arrange for the user interface controls to use different scales for the variables different that may be represented by the control, such as, linear (as illustrated by control 2302), logarithmic (as illustrated by control 2306), parametric (as illustrated by control 2304), and the like. An embodiment may be arranged to use a particular scale based on the type of user-interface being used and the resource that may be represented. In some cases, the scale of the control may be determined based on how the user may be charged for the underlying resource. For example, if a linear increase in the number of server instances many have a logarithmic increase in the cost to the user it may be advantageous to scale the control to account for the change in cost rather than the change in resources.

In some embodiments multiple controls may be linked together such that adjusting one control may cause another control to adjust as well. Also, embodiments may provide additional user controls (not shown), such as, checkboxes, that may enable a user to lock a control so it may remain in a fixed position as other controls are adjusted.

In other embodiments, some controls may represent high level, generalized, or aggregated representations of resources, in this case a user may select a higher level control and "drill-down" into the underlying elements that the high level, generalized, or aggregated control may be representing.

One of ordinary skill in the art will appreciate that the three controls depicted in the embodiment shown in FIG. 23 are merely exemplary and many other configurations and arrangements could be used.

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A computer-implemented method, comprising;
receiving a request for a first user to access an indexed data store associated with a project, wherein the request is based on an invitation received from a second user, and wherein at least some events in a set of events in the indexed data store comprise a portion of raw machine data associated with a timestamp;
determining that the second user is assigned a first role included in one or more roles that enable access to the indexed data store, wherein the first role is associated with a set of permissions for accessing the indexed data store;
assigning at least the first role to the first user based on the second user being assigned the first role;
determining, based on the set of permissions associated with the first role, a set of operations that the first user has permission to perform on the set of events stored in the indexed data store; and
allowing the first user to perform an operation included in the set of operations.

2. The method of claim 1, further comprising determining, prior to assigning the first role to the first user, that the second user has authority to invite the first user to the project.

3. The method of claim 1, further comprising generating an abstract user identity associated with the first user.

4. The method of claim 3, wherein the abstract user identity is uniquely associated with the first user.

5. The method of claim 3, wherein assigning at least the first role to the first user comprises associating the first role with the abstract user.

6. The method of claim 1, further comprising assigning a second role included in the one or more roles to the first user, wherein the second role is not assigned to the second user.

7. The method of claim 1, wherein the first role grants the first user permission to search the set of events stored in the indexed data store.

8. The method of claim 2, wherein the search is performed by a cloud-based search application.

9. The method of claim 1, wherein the first role grants the first user permission to access one or more cloud-based resources associated with the set of events stored in the indexed data.

10. One or more non-transitory computer readable media storing instructions that, when executed by one or more processors, cause the one or more processors to perform the steps of:
receiving a request for a first user to access an indexed data store associated with a project, wherein the request is based on an invitation received from a second user, wherein the indexed data store stores a set of events for the project, and wherein at least some events in the set of events comprise a portion of raw machine data associated with a timestamp;
determining that the second user is assigned a first role included in one or more roles that enable access to the indexed data store, wherein the first role is associated with a set of permissions for accessing the indexed data store;
assigning at least the first role to the first user based on the second user being assigned the first role;

determining, based on the set of permissions associated with the role, a set of operations that the user has permission to perform on the set of events stored in the indexed data store; and allowing the user to perform an operation included in the set of operations.

11. The one or more non-transitory computer readable media of claim 10, wherein the instructions further cause the one or more processors to perform the step of determining, prior to assigning the first role to the first user, that the second user has authority to invite the first user to the project.

12. The one or more non-transitory computer readable media of claim 10, wherein the instructions further cause the one or more processors to perform the step of generating an abstract user identity associated with the first user.

13. The one or more non-transitory computer readable media of claim 12, wherein the abstract user identity is uniquely associated with the first user.

14. The one or more non-transitory computer readable media of claim 12, wherein assigning at least the first role to the first user comprises associating the first role with the abstract user.

15. The one or more non-transitory computer readable media of claim 10, wherein the instructions further cause the one or more processors to perform the step of assigning a second role included in the one or more roles to the first user, wherein the second role is not assigned to the second user.

16. The one or more non-transitory computer readable media of claim 10, wherein the first role grants the first user permission to search the set of events stored in the indexed data store.

17. The one or more non-transitory computer readable media of claim 16, wherein the search is performed by a cloud-based search application.

18. The one or more non-transitory computer readable media of claim 10, wherein the first role grants the first user permission to access one or more cloud-based resources associated with the set of events stored in the indexed data.

19. A system, comprising:

one or more memories storing instructions; and one or more processors that execute the instructions to:

receive a request for a first user to access an indexed data store associated with a project, wherein the request is based on an invitation received from a second user, wherein the indexed data store stores a set of events for the project, and wherein at least some events in the set of events comprise a portion of raw machine data associated with a timestamp;

determine that the second user is assigned a first role included in one or more roles that enable access to the indexed data store, wherein the first role is associated with a set of permissions for accessing the indexed data store;

assign at least the first role to the first user based on the second user being assigned the first role;

determine, based on the set of permissions associated with the role, a set of operations that the user has permission to perform on the set of events stored in the indexed data store; and allow the user to perform an operation included in the set of operations.

20. The system of claim 19, wherein the instructions further cause the one or more processors to determine, prior to assigning the first role to the first user, that the second user has authority to invite the first user to the project.

* * * * *